United States Patent
Takeda et al.

(10) Patent No.: US 12,035,301 B2
(45) Date of Patent: Jul. 9, 2024

(54) MANAGING DEACTIVATION OR DORMANCY OF A COMPONENT CARRIER IN CROSS COMPONENT CARRIER OR MULTIPLE COMPONENT CARRIER SCHEDULING

(71) Applicant: QUALCOMM Incorporated, San Diego, CA (US)

(72) Inventors: Kazuki Takeda, Tokyo (JP); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/444,032

(22) Filed: Jul. 29, 2021

(65) Prior Publication Data

US 2022/0046662 A1 Feb. 10, 2022

Related U.S. Application Data

(60) Provisional application No. 62/706,250, filed on Aug. 6, 2020.

(51) Int. Cl.
*H04W 72/1263* (2023.01)
*H04W 24/08* (2009.01)
*H04W 72/0446* (2023.01)
*H04W 72/0453* (2023.01)
*H04W 72/23* (2023.01)

(52) U.S. Cl.
CPC ....... *H04W 72/1263* (2013.01); *H04W 24/08* (2013.01); *H04W 72/0446* (2013.01); *H04W 72/0453* (2013.01); *H04W 72/23* (2023.01)

(58) Field of Classification Search
CPC ............ H04W 72/1263; H04W 24/08; H04W 72/0446; H04W 72/0453; H04W 72/23; H04L 5/0098; H04L 5/0053; H04L 5/001
See application file for complete search history.

(56) References Cited

U.S. PATENT DOCUMENTS

2015/0092713 A1* 4/2015 Pelletier ................ H04W 72/20
370/329
2021/0336750 A1* 10/2021 Zhou ..................... H04L 5/0098

FOREIGN PATENT DOCUMENTS

EP 2502456 A2 9/2012
WO WO-2019084570 A1 5/2019

OTHER PUBLICATIONS

International Search Report and Written Opinion—PCT/US2021/071076—ISA/EPO—dated Nov 19, 2021.

(Continued)

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a user equipment (UE) may monitor, using a first physical downlink control channel (PDCCH) monitoring behavior, for a first downlink control information (DCI) format that indicates a set of resources associated with at least one of a cross component carrier (CC) scheduling or a multiple CC scheduling associated with a first CC and a second CC. The UE may monitor, using a second PDCCH monitoring behavior based at least in part on a determination that a PDCCH monitoring behavior switch condition is satisfied, for a second DCI format. Numerous other aspects are provided.

30 Claims, 17 Drawing Sheets

(56) References Cited

OTHER PUBLICATIONS

Qualcomm Incorporated: "Fast SCG and SCell Activation", 3GPP Draft, 3GPP TSG-RAN WG1 #97, R1-1907306, Fast SCG and SCELL Activation, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP057728746, XP051709329, pp. 1-11, Retrieved from the Internet: URL: http://www.3gpp.org/ftp/Meetings%5F3GPP%5FSYNC/RAN1/Docs/R1%2D1907306%2Ezip, http://www.3gpp.org/ftp/Meetings%5F3GPP%5FSYNC/RAN1/Docs/R1%2D1907306%2Ezip, [retrieved on May 13, 2019] Section 2.2.2, Section 2.2.1, p. third-p. fifth, figure 3, table 1. the whole document.

* cited by examiner

MANAGING DEACTIVATION OR DORMANCY OF A COMPONENT CARRIER IN CROSS COMPONENT CARRIER OR MULTIPLE COMPONENT CARRIER SCHEDULING

CROSS-REFERENCE TO RELATED APPLICATION

This patent application claims priority to U.S. Provisional Patent Application No. 62/706,250, filed on Aug. 6, 2020, entitled "MANAGING DEACTIVATION OR DORMANCY OF A COMPONENT CARRIER IN CROSS COMPONENT CARRIER OR MULTIPLE COMPONENT CARRIER SCHEDULING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for managing deactivation or dormancy of a component carrier (CC) in cross CC or multiple CC scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LIE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a configuration indicating a first downlink control information (DCI) format and a second DCI format; monitoring, using a first physical downlink control channel (PDCCH) monitoring behavior, for a first DCI format that indicates a set of resources associated with at least one of a cross component carrier (CC) scheduling or a multiple CC scheduling associated with a first CC and a second CC; and monitoring, using a second PDCCH monitoring behavior based at least in part on a determination that a PDCCH monitoring behavior switch condition is satisfied, for a second DCI format.

In some aspects, a method of wireless communication performed by a base station includes transmitting, to a UE, a first physical downlink shared channel (PDSCH) communication using a first plurality of PDSCH resources, wherein the first plurality of resources are indicated by a first DCI communication having a first DCI format, wherein the first DCI communication indicates a set of resources associated with at least one of a cross CC scheduling or a multiple CC scheduling associated with a first CC and a second CC, wherein the set of resources includes the first plurality of PDSCH resources; and transmitting a second DCI communication having a second DCI format based at least in part on a determination that a PDCCH monitoring behavior switch condition is satisfied.

In some aspects, a UE for wireless communication includes a memory and one or more processors coupled to the memory, the one or more processors configured to receive a configuration indicating a first DCI format and a second DCI format; monitor, using a first PDCCH monitoring behavior, for a first DCI format that indicates a set of resources associated with at least one of a cross CC scheduling or a multiple CC scheduling associated with a first CC and a second CC; and monitor, using a second PDCCH monitoring behavior based at least in part on a determination that a PDCCH monitoring behavior switch condition is satisfied, for a second DCI format.

In some aspects, a base station for wireless communication includes a memory and one or more processors coupled to the memory, the one or more processors configured to transmit, to a UE, a first PDSCH communication using a first plurality of PDSCH resources, wherein the first plurality of resources are indicated by a first DCI communication having a first DCI format, wherein the first DCI communication indicates a set of resources associated with at least one of a cross CC scheduling or a multiple CC scheduling associated with a first CC and a second CC, wherein the set of resources includes the first plurality of PDSCH resources; and transmit a second DCI communication having a second DCI format based at least in part on a determination that a PDCCH monitoring behavior switch condition is satisfied.

In some aspects, a non-transitory computer-readable medium storing a set of instructions for wireless communication includes one or more instructions that, when executed by one or more processors of a UE, cause the UE to receive a configuration indicating a first DCI format and a second DCI format; monitor, using a first PDCCH monitoring behavior, for a first DCI format that indicates a set of resources associated with at least one of a cross CC scheduling or a multiple CC scheduling associated with a first CC and a second CC; and monitor, using a second PDCCH monitoring behavior based at least in part on a determination that a PDCCH monitoring behavior switch condition is satisfied, for a second DCI format.

In some aspects, a non-transitory computer-readable medium storing a set of instructions for wireless communication includes one or more instructions that, when executed by one or more processors of a base station, cause the base station to transmit, to a UE, a first PDSCH communication using a first plurality of PDSCH resources, wherein the first plurality of resources are indicated by a first DCI communication having a first DCI format, wherein the first DCI communication indicates a set of resources associated with at least one of a cross CC scheduling or a multiple CC scheduling associated with a first CC and a second CC, wherein the set of resources includes the first plurality of PDSCH resources; and transmit a second DCI communication having a second DCI format based at least in part on a determination that a PDCCH monitoring behavior switch condition is satisfied.

In some aspects, an apparatus for wireless communication includes means for receiving a configuration indicating a first DCI format and a second DCI format; means for monitoring, using a first PDCCH monitoring behavior, for a first DCI format that indicates a set of resources associated with at least one of a cross CC scheduling or a multiple CC scheduling associated with a first CC and a second CC; and means for monitoring, using a second PDCCH monitoring behavior based at least in part on a determination that a PDCCH monitoring behavior switch condition is satisfied, for a second DCI format.

In some aspects, an apparatus for wireless communication includes means for transmitting, to a UE, a first PDSCH communication using a first plurality of PDSCH resources, wherein the first plurality of resources are indicated by a first DCI communication having a first DCI format, wherein the first DCI communication indicates a set of resources associated with at least one of a cross CC scheduling or a multiple CC scheduling associated with a first CC and a second CC, wherein the set of resources includes the first plurality of PDSCH resources; and means for transmitting a second DCI communication having a second DCI format based at least in part on a determination that a PDCCH monitoring behavior switch condition is satisfied.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
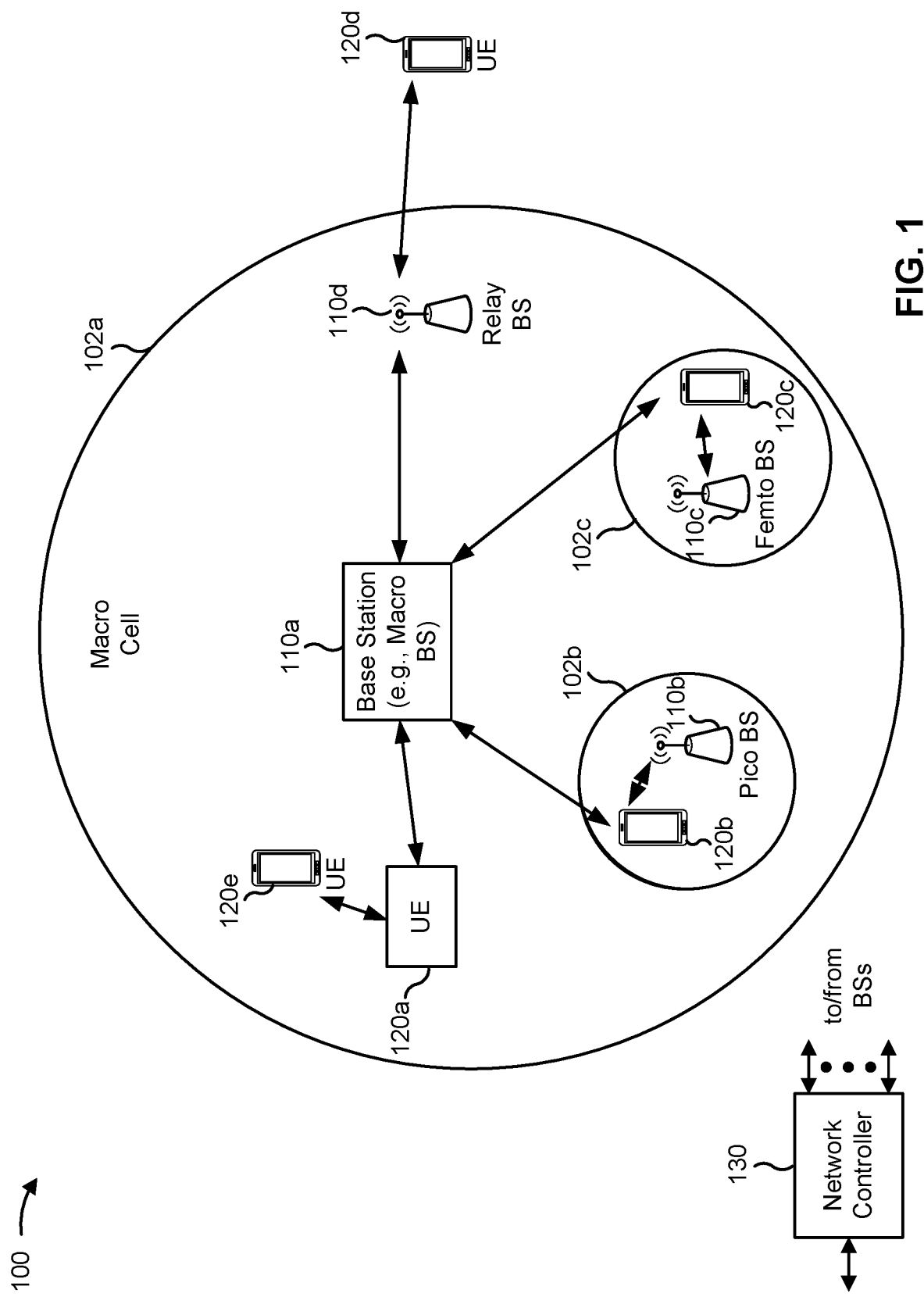
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or a Long Term Evolution (LTE) network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
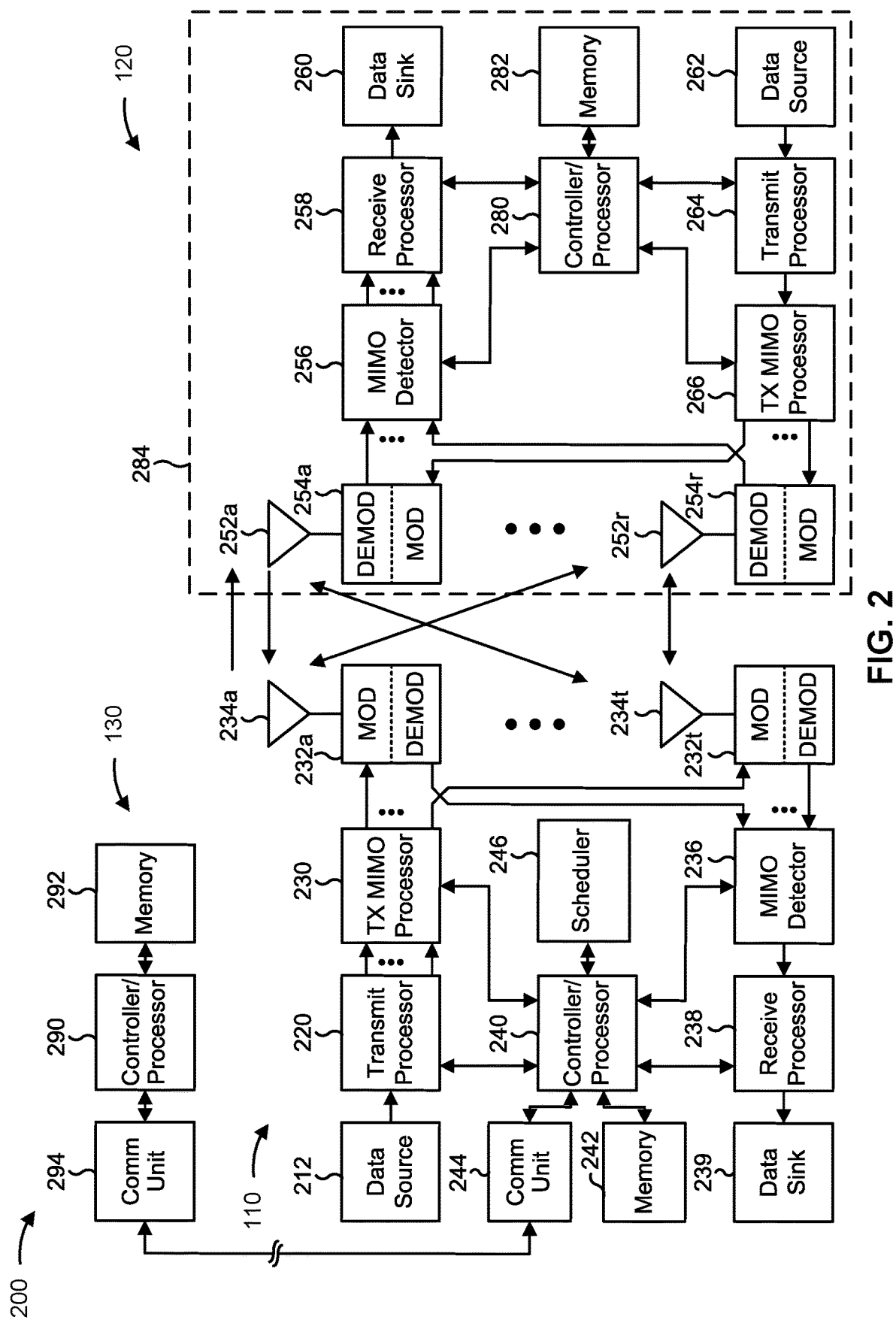
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-15).

Controller/processor 240 of base station 110, controller/processor 280 of UE 120, and/or any other component(s) of FIG. 2 may perform one or more techniques associated with managing deactivation or dormancy of a component carrier (CC) in cross CC or multiple CC scheduling, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, UE 120 may include means for monitoring, using a first physical downlink control channel (PDCCH) monitoring behavior, for a first downlink control information (DCI) format that indicates a set of resources associated with at least one of a cross CC scheduling or a multiple CC scheduling associated with a first CC and a second CC, means for monitoring, using a second PDCCH monitoring behavior based at least in part on a determination that a PDCCH monitoring behavior switch condition is satisfied, for a second DCI format, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a first physical downlink shared channel (PDSCH) communication using a first plurality of PDSCH resources, wherein the first plurality of resources are indicated by a first DCI communication having a first DCI format, wherein the first DCI communication indicates a set of resources associated with at least one of a cross CC scheduling or a multiple CC scheduling associated with a first CC and a second CC, wherein the set of resources includes the first plurality of PDSCH resources, means for transmitting a second DCI communication having a second DCI format based at least in part on a determination that a PDCCH monitoring behavior switch condition is satisfied, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
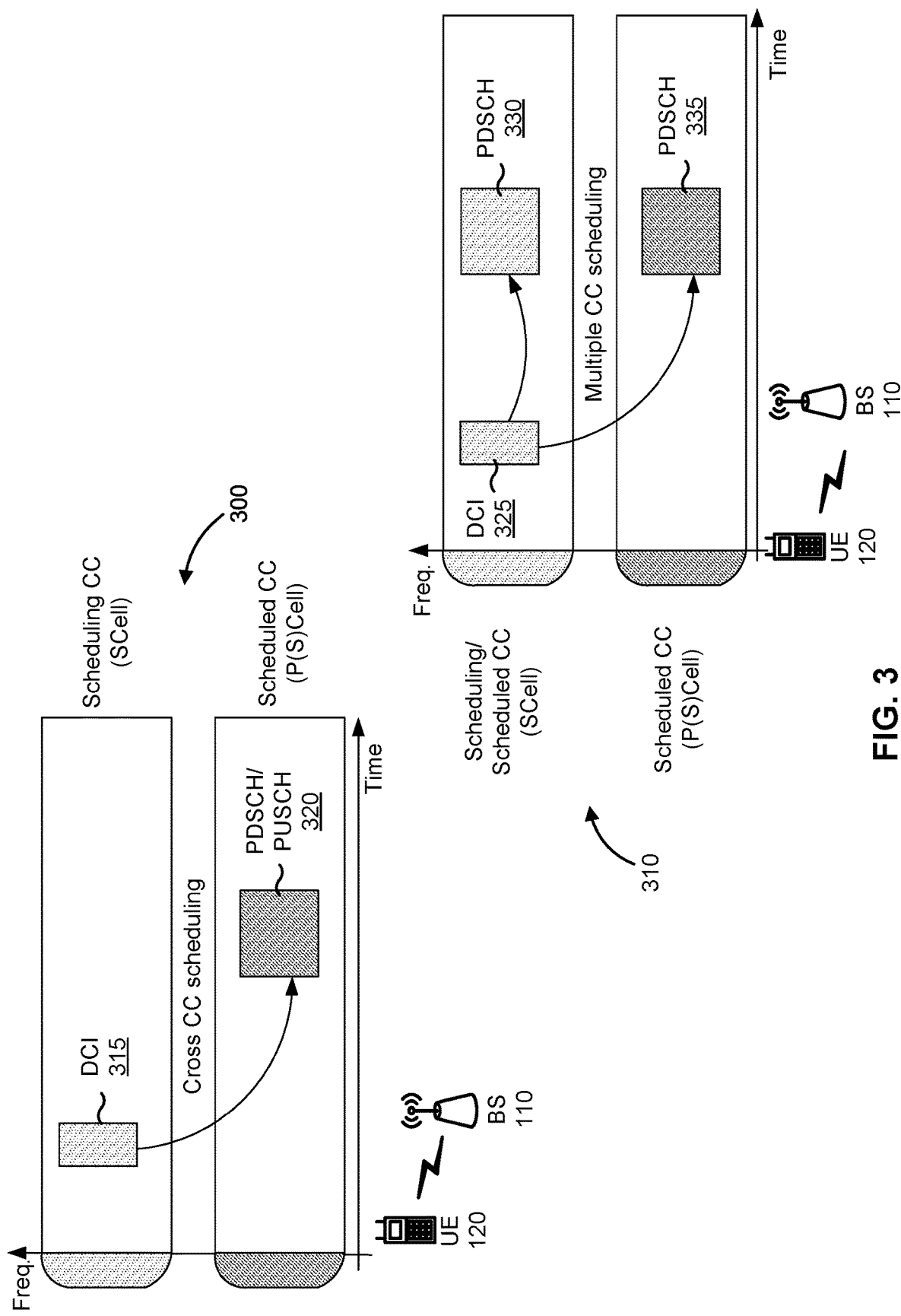
FIGS. 3-6 are diagrams illustrating examples of cross component carrier (CC) scheduling and multiple CC scheduling, in accordance with the present disclosure.

FIG. 3 is a diagram illustrating examples of cross CC scheduling 300 and multiple CC scheduling 310, in accordance with the present disclosure. As shown, a UE 120 and a base station 110 (shown as "BS") may communicate with one another using carrier aggregation in which two or more CCs may be utilized for carrying control communications, data communications, and/or the like.

As shown by reference number 300, a first CC may include a scheduling CC and a second CC may include a scheduled CC. As shown, CCs may be implemented as cells and used, for example, for general carrier aggregation scenarios, dynamic spectrum sharing (DSS), and/or the like. In some aspects, a CC may include one or more carriers. In some aspects, a carrier may include one or more CCs. In a typical scenario, the UE 120 may be connected to a primary cell (shown as "PCell"). The UE 120 may maintain a connection to the primary cell, which may provide functionality such as, for example, initial access, random access, paging, and/or the like.

In some aspects, a secondary cell (shown as "SCell") may be activated. As shown, for the purpose of the concepts described herein, both illustrated CCs may be secondary CCs, or one CC may be a primary CC. In some aspects, the primary cell and the secondary cell may be provided by the same BS 110. In some aspects, the primary cell and the secondary cell may be provided by different BSs 110. In some aspects, for example, the secondary cell may be activated to handle an increase in traffic. In some aspects, more than one secondary cell may be activated.

In a typical case, a primary cell may be used to schedule data communications on the primary cell and/or a secondary cell. The data communications may include PDSCH communications, physical uplink shared channel (PUSCH) communications, and/or the like. In some cases, as shown, a secondary cell may be used to schedule data communications for the secondary cell, another secondary cell, and/or a primary cell. For example, as shown by reference number 300, in cross CC scheduling, a DCI communication 315 transmitted using a secondary cell (the scheduling CC) may be used to schedule a PDSCH and/or PUSCH communication 320 on a primary cell or another secondary cell (the scheduled CC). As shown by reference number 310, in multiple CC scheduling, a DCI communication 325 may be transmitted using a secondary cell for scheduling a PDSCH communication 330 in the same cell and a PDSCH communication 335 in a primary cell or another secondary cell.

Each cell may be associated with a respective one or more bandwidth part (BWP) configurations. The UE 120 may be associated with one or more active BWPs. For example, an active BWP may be associated with a cell. An active BWP may use a BWP configuration for the associated cell. In some aspects, both cells may be associated with a respective active BWP. In some aspects, only the scheduling cell may be associated with an active BWP. In some aspects, only the primary cell may be associated with an active BWP.

Each BWP configuration may be associated with a respective search space configuration. The search space configuration may identify a configuration for a search space (e.g., aggregation level, number of candidates, monitoring periodicity, monitoring symbols within a slot, DCI formats to monitor, associated control resource set (CORESET), etc.) that the UE is to use to receive information when using the BWP configuration for an active BWP. The search space configuration may be associated with a CORESET included in the BWP configuration. In some aspects, multiple BWP configurations may be associated with a single CORESET. For example, the single CORESET may be included in multiple overlapping BWPs.

As indicated above, FIG. 3 is provided as an example. Other examples may differ from what is described with regard to FIG. 3.

Figure 4:
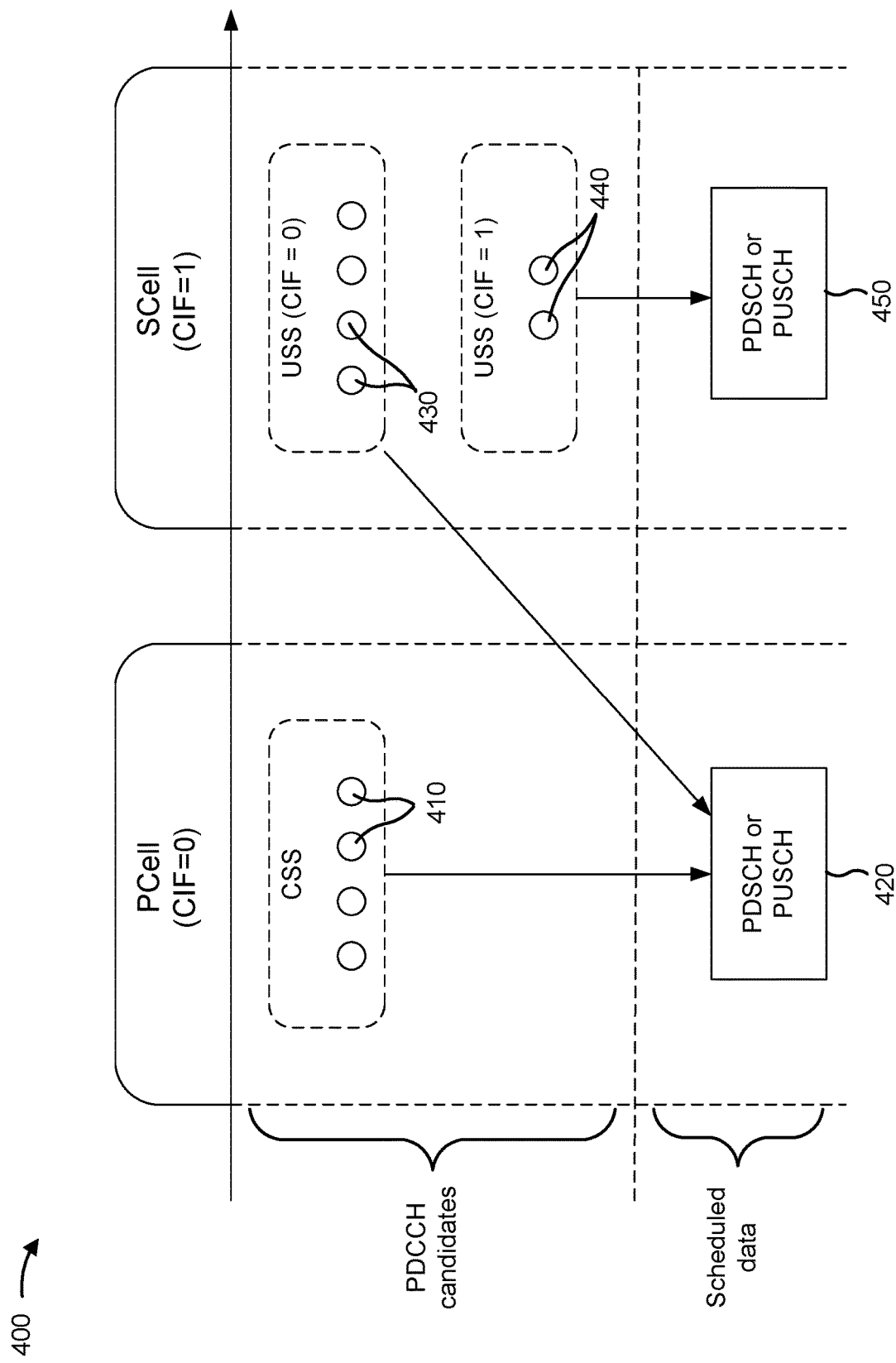

FIG. 4 is a diagram illustrating an example 400 of cross CC scheduling, in accordance with the present disclosure. As shown, a pair of CCs may be configured for cross CC scheduling.

As shown by FIG. 4, primary cell (shown as "PCell") and a secondary cell (shown as "SCell") may include respective PDCCH candidates and scheduled data. The primary cell may include a common search space (CSS) that includes PDCCH candidates 410 for scheduling data communications 420 (shown as "PDSCH or PUSCH") on the primary cell. In some aspects, an existing cross-carrier scheduling framework for using PDCCH candidates on a primary cell to schedule data communications on a secondary cell may be adapted for using PDCCH candidates on a secondary cell to schedule data communications on a primary cell. In some aspects, for example, cross CC scheduling from a secondary cell to the primary cell may be used for non-fallback DCI with a carrier indicator field (CIF) on a UE specific search space (USS).

In some aspects, the UE (e.g., the UE 120) may identify PDCCH candidates for DCI scheduling from the secondary cell to the primary cell based on a CIF value (e.g., an n CI variable of a hash function). For example, as shown, PDCCH candidates 430 on the secondary cell that are configured for scheduling data communications 420 on the primary cell may indicate a CIF value (e.g., CIF=0) that matches a CIF value associated with the primary cell. Similarly, PDCCH candidates 440 on the secondary cell that are configured for scheduling data communications 450 on the secondary cell may indicate a CIF value (e.g., CIF=1) that matches a CIF value associated with the secondary cell. In some aspects, if the primary cell PDSCH and the secondary cell PDCCH use different subcarrier spacings (SCSs), a PDSCH preparation time may be provided to account for the timing differences.

In some aspects, during cross CC scheduling and/or data communications, the UE may continue to monitor the CSS on the primary cell so that UE behaviors regarding scenarios such as broadcast, fallback, and radio link failure (RLF) are maintained Thus, in some aspects, the UE may monitor PDCCH candidates 410 and 430 on two cells that are for scheduling the primary cell data communications. In some aspects, the UE may not be required to handle time-overlapping cell radio network temporary identifier (C-RNTI) PDSCHs on the primary cell scheduled by the primary cell and the secondary cell. In some aspects, the UE may be able to process time-overlapping unicast PDSCH communications and system information (SI) RNTI PDSCH communications during paging RNTI (P-RNTI) triggered SI acquisition for frequency range 1 (FR1).

As indicated above, FIG. 4 is provided as an example. Other examples may differ from what is described with regard to FIG. 4.

Figure 5:
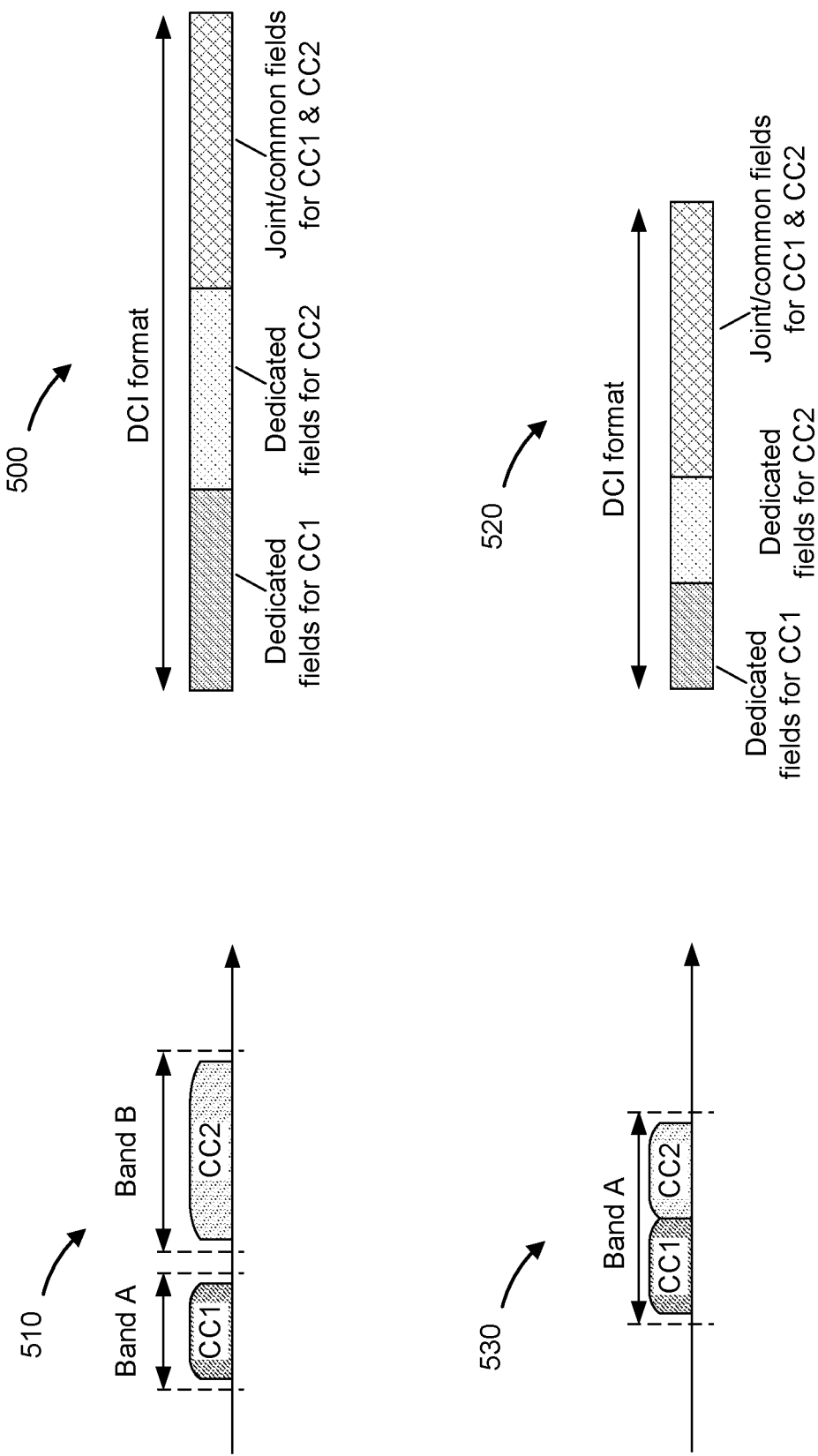

FIG. 5 is a diagram illustrating examples of cross CC scheduling and multiple CC scheduling, in accordance with the present disclosure. As shown, a unified DCI format 500 may be provided for scheduling data communications 510 (e.g., PDSCH communications) on a first CC (shown as "CC1") and a second CC (shown as "CC2") where CC1 and CC2 are in different frequency bands (shown respectively as "Band A" and "Band B"). In some aspects, CC1 and CC2 may use different SCSs.

As shown in FIG. 5, a unified DCI format 520 may be provided for scheduling data communications 530 on CC1 and CC2, where CC1 and CC2 are in the same band (Band A) and use the same SCS. As shown, the DCI formats 500 and 520 may include a set of dedicated fields for scheduling data communications on CC1, a set of dedicated fields for scheduling communications on CC2, and a set of joint or common (shown as "joint/common") fields for scheduling CC1 and CC2. As shown, a DCI format 520 for scheduling on a CC1 and a CC2 that are in the same band may include fewer data fields than a DCI format 500 for scheduling on CCs in different bands. The joint/common fields may enable reduction in DCI payload, while the dedicated fields may facilitate flexibility.

As indicated above, FIG. 5 is provided as an example. Other examples may differ from what is described with regard to FIG. 5.

Figure 6:
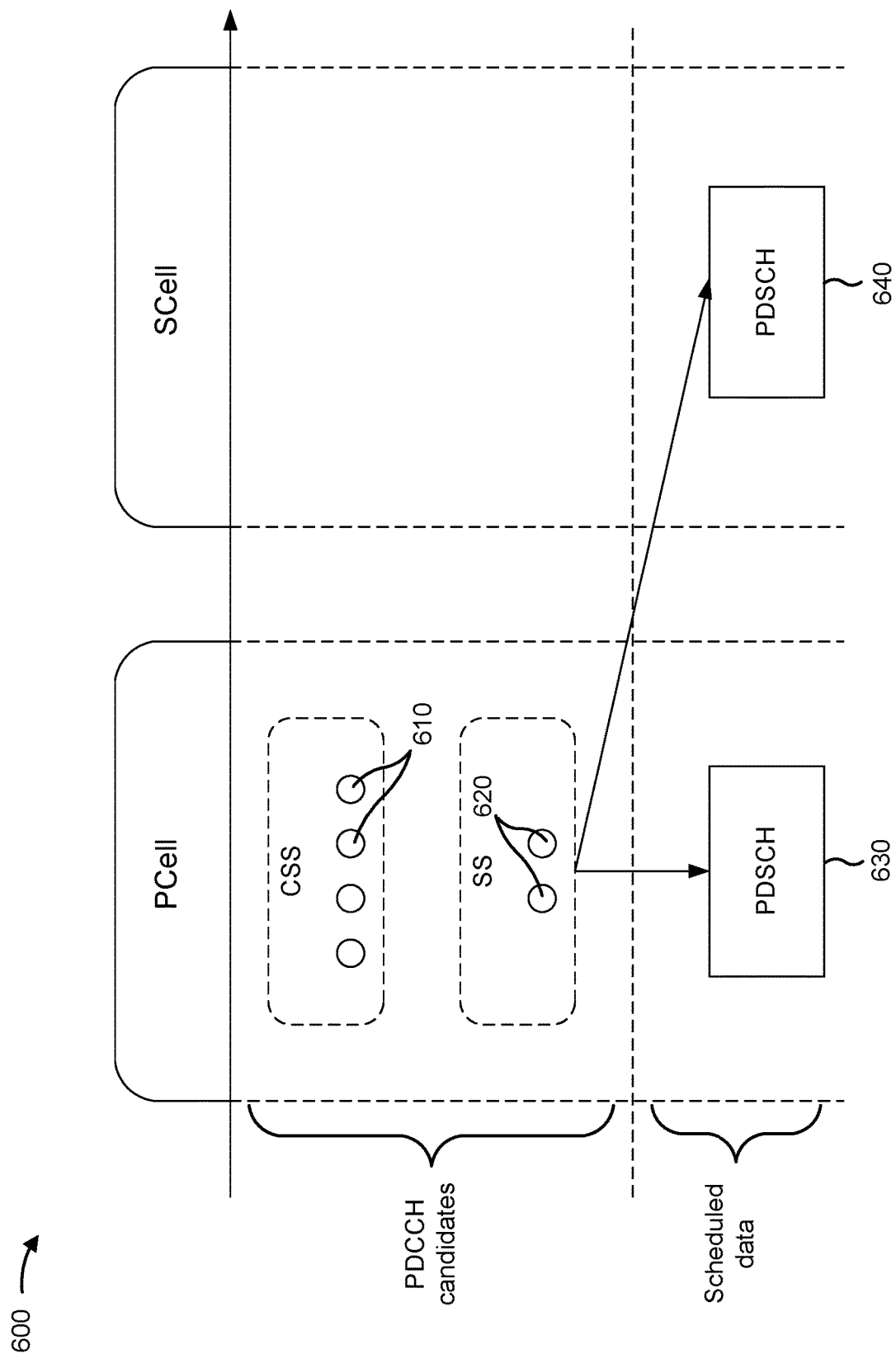

FIG. 6 is a diagram illustrating an example 600 of multiple CC scheduling, in accordance with the present disclosure. As shown, a primary cell ("PCell") may be used for scheduling data communications (e.g., PDSCH communications) on the primary cell and the secondary cell.

In some aspects, a DCI for scheduling PDSCHs on multiple CCs may be supported. In some aspects, the UE may be able to identify the PDCCH candidates for scheduling a set of CCs based at least in part on the DCI. For example, in some aspects, a set of CCs may be configured for scheduling and may be associated with a search space ("SS") or a particular DCI format. In some aspects, as shown, the primary cell may include a CSS with PDCCH candidates 610 for primary cell functions and an SS with a set of PDCCH candidates 620 for multiple CC scheduling. The PDCCH candidates 620 may be indicated, for example, as being configured for scheduling data communications (e.g., PDSCH communications) 630 on the primary cell and data communications (e.g., PDSCH communications) 640 on the secondary cell. In some aspects, the PDCCH candidates may be indicated in a DCI for multiple CC scheduling. The DCI may include, for example, a bitmap that indicates whether a particular PDCCH candidate is configured for scheduling on a "CC1," a "CC2," or a "CC1+CC2." By providing this indication, the network may reduce reliance on monitoring legacy DCI formats. A legacy format is a format that is already in existence as of the time of filing of this application. Legacy formats may be, for example, formats that are defined by a wireless communication standard.

As indicated above, FIG. 6 is provided as an example. Other examples may differ from what is described with regard to FIG. 6.

In some cases, a secondary cell may be activated and/or deactivated according to a medium access control (MAC) control element (MAC-CE) indication, a deactivation timer, and/or the like. In some cases, a BWP of a secondary cell may be a dormant BWP, in which case the UE may not monitor PDCCH for the secondary cell. For the cross CC scheduling scenario illustrated in FIG. 4, if the secondary cell is deactivated or the BWP of the secondary cell is the dormant BWP, the UE may not receive a DCI format that schedules unicast data (PDSCH and/or PUSCH) on the primary cell.

For the multiple CC scheduling shown in FIG. 6, even if the secondary cell is deactivated or the BWP of the secondary cell is the dormant BWP, the DCI for multiple CC scheduling can still be used to schedule data on the primary cell. However, many of the DCI fields may be useless (e.g., fields used for the secondary cell), thereby unnecessarily increasing control signaling overhead. In some cases, if the DCI for multiple CC scheduling is for data scheduling on the primary cell and on a secondary cell, and if the DCI is monitored on the secondary cell, if the secondary cell is deactivated or the BWP of the secondary cell is the dormant BWP, the UE may not be able to receive a DCI format that schedules unicast data (PDSCH and/or PUSCH) on the primary cell. For example, in FIG. 6, if the multiple CC PDCCH candidates 620 are on the secondary cell and the secondary cell is deactivated or a BWP associated with the secondary cell is a dormant BWP, the UE may not be able to identify any PDCCH candidates for scheduling data communications on the primary cell. This may lead to service interruptions, less throughput, less flexibility, and less reliability.

Aspects of techniques and apparatuses described herein may provide alternative UE behavior for PDCCH monitoring that is based at least in part on a secondary cell activation/deactivation status and/or whether the BWP of the secondary cell is the dormant BWP. In some aspects, the UE may monitor, using a first PDCCH monitoring behavior, for a first DCI format that indicates a set of resources associated with at least one of a cross CC scheduling or a multiple CC scheduling associated with a first CC and a second CC. The UE may determine that a PDCCH monitoring behavior switch condition is satisfied and, based at least in part on the determination that the PDCCH monitoring behavior switch condition is satisfied, the UE may monitor, using a second PDCCH monitoring behavior for a second DCI format. In some aspects, for example, the UE may determine that the PDCCH monitoring behavior switch condition is satisfied based at least in part on determining that the second CC is deactivated, determining that an active BWP of the second CC is a dormant BWP, determining that an active downlink BWP satisfies a BWP switching condition, wherein the active downlink BWP is associated with at least one of the first CC or the second CC, and/or the like.

In some aspects, the DCI format contents of the second DCI format may be different than the DCI format contents of the first DCI format. As a result, the contents of the DCI format may be dependent on the secondary cell activation/deactivation status and/or whether the BWP of the secondary cell is a dormant BWP. In this way, data scheduling may still be possible in a multiple CC scheduling scenario when a non-scheduling CC is deactivated, or a BWP of a non-scheduling CC is a dormant BWP. In some aspects, the DCI format size and contents may be dependent on a cell activation/deactivation status or whether the BWP of the secondary cell is a dormant BWP. In this way, data scheduling may still be possible in a multiple CC scheduling scenario where a non-scheduling CC is deactivated, or its BWP is a dormant BWP. In some aspects, a DCI format type and/or location (e.g., the CC where the DCI format is monitored) may be dependent on a cell activation/deactivation status or whether the BWP of the secondary cell is a dormant BWP. In this way, data scheduling may still be possible in a cross CC scheduling scenario or a multiple CC scheduling scenario where the scheduling CC is deactivated, or its BWP is a dormant BWP. As a result, aspects of the techniques described herein may facilitate maintaining PDCCH candidates for scheduling data when one CC is unable to carry the data or DCI, thereby leading to fewer service interruptions, more throughput, more flexibility, and more reliability.

Figure 7:
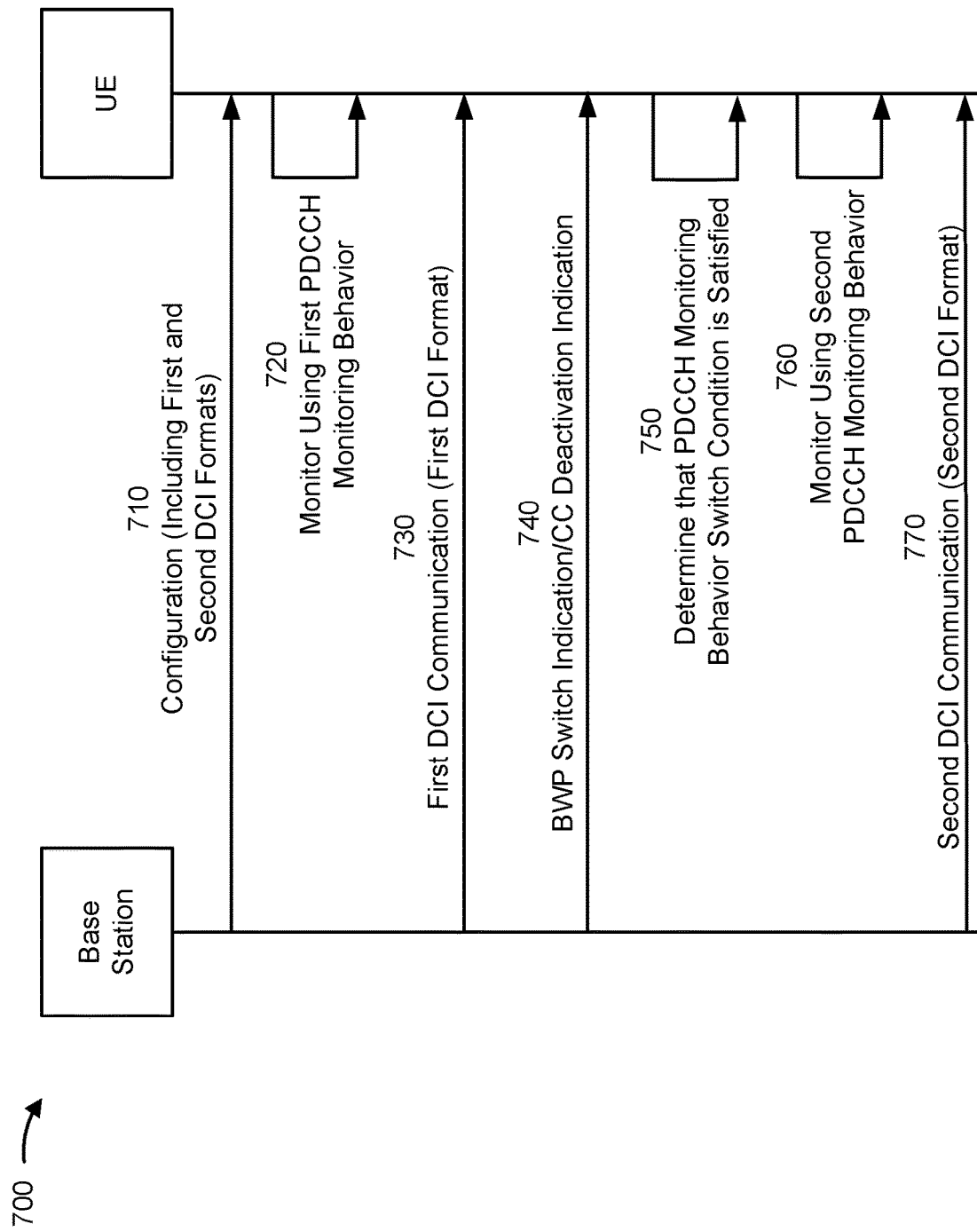
FIG. 7 is a diagram illustrating an example associated with managing deactivation or dormancy of a CC in cross CC or multiple CC scheduling, in accordance with the present disclosure.

FIG. 7 is a diagram illustrating an example 700 associated with managing deactivation or dormancy of a CC in cross CC or multiple CC scheduling, in accordance with the present disclosure. As shown, a base station (e.g., the base station 110) and a UE (e.g., the UE 120) may communicate with one another. In some aspects, the base station may communicate using two or more different CCs (e.g., a primary cell and one or more secondary cells). In some aspects, the base station may include a plurality of base stations that may communicate with the UE using a plurality of CCs.

As shown by reference number 710, the base station may transmit, and the UE may receive, a configuration. In some aspects, the configuration may indicate a first DCI format and a second DCI format. In some aspects, the configuration may indicate a cross CC scheduling scheme, USS identifiers, CIF values corresponding to CCs, CIF values corresponding to PDCCH candidates, PDSCH resources, PUSCH resources, and/or the like.

As shown by reference number 720, the UE may monitor, using a first PDCCH monitoring behavior, for the first DCI format. In some aspects, the first DCI format may indicate a set of resources associated with at least one of a cross CC scheduling or a multiple CC scheduling associated with a first CC and a second CC. In some aspects, monitoring using the first PDCCH monitoring behavior may include monitoring a first PDCCH associated with the first CC.

As shown by reference number 730, the base station may transmit, and the UE may receive, a first DCI communication. In some aspects, the first DCI communication may include the first DCI format. As shown by reference number 740, the base station may transmit, and the UE may receive, a BWP switch indication that indicates that an active BWP of a cell is switching to a BWP that is a dormant BWP. In some aspects, the base station may transmit, and the UE may receive, an indication that a CC has been deactivated.

As shown by reference number 750, the UE may determine that a PDCCH behavior switch condition is satisfied. In some aspects, the UE may determine that the PDCCH behavior switch condition is satisfied based at least in part on receiving the indication of the BWP switch, the indication of deactivation of a CC, and/or the like. In some aspects, the UE may determine that the PDCCH monitoring behavior switch condition is satisfied based at least in part on determining that the second CC is deactivated, determining that an active BWP of the second CC is a dormant BWP, or determining that an active downlink BWP satisfies a BWP switching condition, wherein the active downlink BWP is associated with at least one of the first CC or the second CC. In some aspects, the UE may determine that the PDCCH monitoring behavior switch condition is satisfied based at least in part on expiration of a deactivation timer.

In some aspects, the UE may determine that the PDCCH monitoring behavior switch condition is satisfied based at least in part on determining that the active downlink BWP satisfies a BWP switching condition. In some aspects, the UE may determine that the active downlink BWP satisfies the BWP switching condition by determining that a bandwidth of the active downlink BWP satisfies a bandwidth threshold, determining that an achievable downlink data rate associated with the active downlink BWP satisfies a threshold, determining that a BWP identifier associated with the active downlink BWP is identified as a non-scheduling BWP, and/or the like.

In some aspects, the achievable downlink data rate may be based at least in part on an SCS associated with the active downlink BWP, a number of resource blocks associated with the active downlink BWP, a number of layers associated with the active downlink BWP, a maximum MCS value associated with the active downlink BWP, an overhead factor associated with the active downlink BWP, and/or the like.

In some aspects, the UE may receive (e.g., from the base station) a list of non-scheduling BWPs. The UE may determine that the BWP identifier associated with the active downlink BWP is identified as a non-scheduling BWP by determining that the BWP identifier is included in the list. In some aspects, where the active downlink BWP is associated with a scheduling CC that is a secondary cell, the UE may determine that the BWP identifier associated with the active downlink BWP is identified as a non-scheduling BWP by determining that the active downlink BWP is a dormant BWP.

As shown by reference number 760, the UE may monitor, using a second PDCCH monitoring behavior based at least in part on a determination that a PDCCH monitoring behavior switch condition is satisfied, for a second DCI format. In some aspects, monitoring using the second PDCCH monitoring behavior may include monitoring a second PDCCH associated with the second CC.

As shown by reference number 770, the base station may transmit, and the UE may receive, a second DCI communication. In some aspects, the second DCI communication may include the second configured DCI format. The second DCI format may be different than the first DCI format. In some aspects, at least one characteristic of the second DCI format may be based at least in part on determining that the PDCCH monitoring behavior switch condition is satisfied. The at least one characteristic of the second DCI format may include a set of contents of the second DCI format, a size of the second DCI format, a format type corresponding to the second DCI format, and/or the like.

In some aspects, the format type corresponding to the second DCI format may match a format type corresponding to the first DCI format. A format type may match another format type if the format types are the same or similar. In some aspects, the format types may match if the DCI formats include the same data fields. In some aspects, the data fields of matching format types may be of different sizes.

In some aspects, the UE may be configured with monitoring a first DCI format that can schedule PDSCHs on more than one CC. The UE may identify the contents and fields of the DCI format based on whether a scheduled CC by the DCI format is active or deactivated. In some aspects, the UE may identify the contents and fields of the DCI format based on whether the BWP of the scheduled CC by the DCI format is a non-dormant or a dormant BWP.

For example, in some aspects, a first CC may be used to transmit a first DCI communication having a first DCI format scheduling data communications associated with the first CC and a second CC. The UE and/or the base station may determine that the PDCCH monitoring behavior switch condition is satisfied by determining that a second CC is deactivated or determining that an active BWP of the second CC is a dormant BWP. The first DCI format may include a set of dedicated data fields associated with the second CC, and, in the first DCI format, the set of dedicated data fields associated with the second CC may include PDSCH scheduling information corresponding to the second CC. The set of dedicated data fields associated with the second CC may indicate a frequency domain resource allocation, a time domain resource allocation, an MCS, a hybrid automatic repeat request (HARQ) process identifier (ID), a redundancy version (RV), a transmitted precoding matrix indicator (TPMI), an antenna port, and/or the like.

Based at least in part on determining that the PDCCH monitoring behavior switching condition is satisfied, the base station may transmit a second DCI communication to the UE. The second DCI communication may include the second DCI format. In some aspects, the second DCI format may include the set of dedicated data fields associated with the second CC, and, in the second DCI format, the set of dedicated data fields associated with the second CC may not include the PDSCH scheduling information.

In some aspects, in the second DCI format, the set of dedicated data fields associated with the second CC may be fixed to a particular value (e.g., all ones or zeroes). In some aspects, a payload size of the first DCI format may be equal to a payload size of the second DCI format. In this way, the UE may be able to recognize the second DCI format readily, as the structure would be the same as the first DCI format. However, because some fields are unused, aspects may increase signaling overhead.

In some aspects, the UE may identify the contents and/or fields, and the size of the DCI format, based on whether a scheduled CC by the DCI format is active or deactivated, based on whether the BWP of the scheduled CC by the DCI format is a non-dormant or dormant BWP, and/or the like. For example, in some aspects, the at least one characteristic of the second DCI format may include the set of contents of the second DCI format and the size of the second DCI format. The first DCI format may include a set of dedicated data fields associated with the second CC (as described above), and, in the first DCI format, the set of dedicated data fields associated with the second CC may include PDSCH scheduling information corresponding to the second CC. In contrast, the second DCI format may not include the set of dedicated data fields associated with the second CC. In some aspects, the first DCI format has a first payload size and the second DCI format has a second payload size that is smaller than the first payload size. In this way, control signaling overhead may be reduced. A tradeoff may be less reliable detection of the second DCI format by the UE.

In some aspects, the first DCI format may have a first format type and the second DCI format may have a second format type. For example, in some aspects, the first format type may correspond to multiple CC scheduling and the second format type may correspond to single CC scheduling. In some aspects, for example, the second format type may include a DCI format 1_0 (which may be alternatively referred to as a legacy DCI format 1_0), a DCI format 1_1 (which may be alternatively referred to as a legacy DCI format 1_1), or a DCI format 1_2 (which may be alternatively referred to as a legacy DCI format 1_2). In some aspects, the UE may monitor, using the first PDCCH monitoring behavior, for the first DCI format by monitoring a first PDCCH for the first DCI format, where the first PDCCH corresponds to the second CC. The UE may monitor, using the second PDCCH monitoring behavior, for the second DCI format by monitoring a second PDCCH for the second DCI format, where the second PDCCH corresponds to the first CC.

In some aspects, where the UE determines that the PDCCH monitoring behavior switch condition is satisfied by determining that an active downlink BWP (associated with the second CC) satisfies a BWP switching condition, the UE may monitor, using the second PDCCH monitoring behavior for the second DCI format, a second PDCCH for the second format, where the second PDCCH corresponds to the first CC or a third CC (e.g., another secondary cell).

As indicated above, FIG. 7 is provided as an example. Other examples may differ from what is described with regard to FIG. 7.

Figure 8:
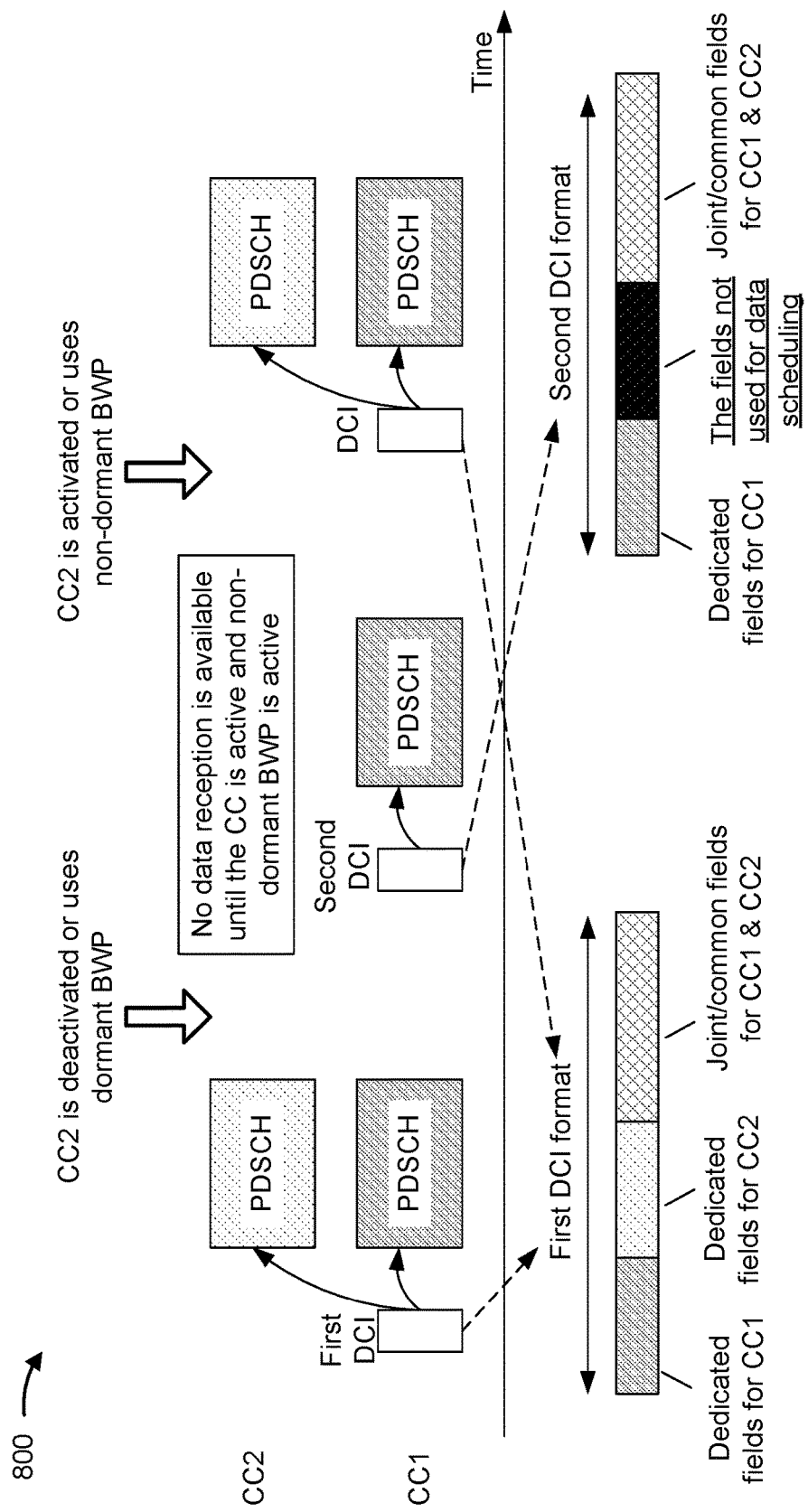
FIGS. 8-13 are diagrams illustrating examples of managing deactivation or dormancy of a CC in cross CC or multiple CC scheduling, in accordance with the present disclosure.

FIG. 8 is a diagram illustrating an example 800 of managing deactivation or dormancy of a CC in cross CC or multiple CC scheduling, in accordance with the present disclosure. As shown, a UE may be configured with monitoring a first DCI format that can schedule PDSCHs on more than one CC (shown as "CC1" and "CC2"). The UE may identify the contents and fields of the first or second DCI format based on whether a scheduled CC by the DCI format is active or deactivated, or based on whether the BWP of the scheduled CC by the DCI format is a non-dormant or a dormant BWP.

As shown, for example, a base station may provide the first CC, where the first CC is a scheduling CC. The base station may transmit the first DCI communication (shown as "first DCI") that may include a set of resources associated with multiple CC scheduling. The set of resources may include, for example, a plurality of PDSCH resources associated with the second CC. The first DCI format may include a set of dedicated data fields associated with the second CC, and, in the first DCI format, the set of dedicated data fields associated with the second CC include PDSCH scheduling information. In the second DCI format, the dedicated fields associated with the second CC may not be used for data scheduling.

As indicated above, FIG. 8 is provided as an example. Other examples may differ from what is described with regard to FIG. 8.

Figure 9:
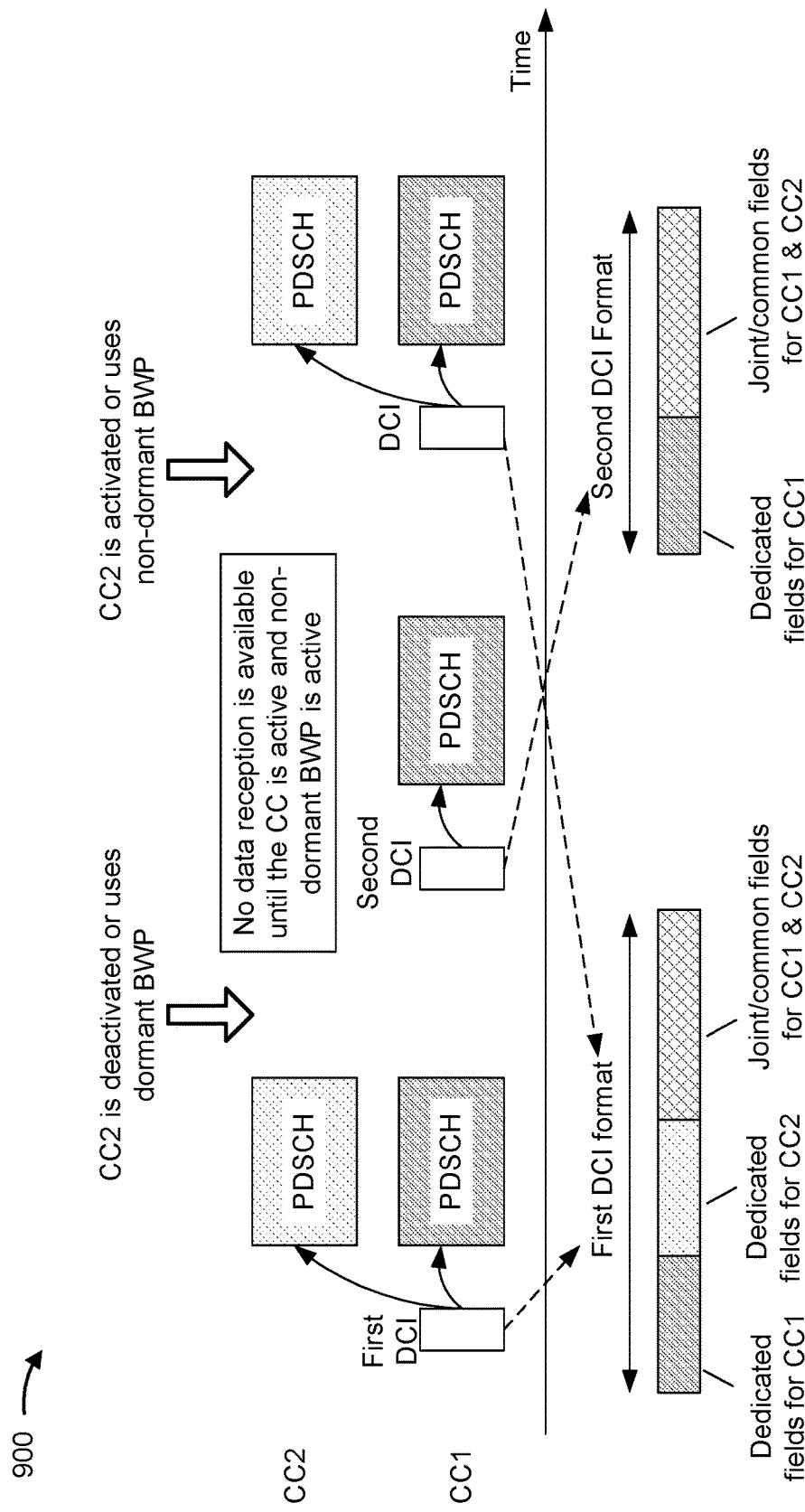

FIG. 9 is a diagram illustrating an example 900 of managing deactivation or dormancy of a CC in cross CC or multiple CC scheduling, in accordance with the present disclosure. As shown, UE may identify the contents and/or fields of the DCI format, and the size of the DCI format, based on whether a scheduled CC by the DCI format is active or deactivated, or based one whether the BWP of the scheduled CC by the DCI format is a non-dormant or a dormant BWP.

The first DCI format may include a set of dedicated data fields associated with the second CC, and, in the first DCI format, the set of dedicated data fields associated with the second CC may include PDSCH scheduling information corresponding to the second CC. As shown, the second DCI format may not include the set of dedicated data fields associated with the second CC. In some aspects, the first DCI format may have a first payload size and the second DCI format may have a second payload size that is smaller than the first payload size.

As indicated above, FIG. 9 is provided as an example. Other examples may differ from what is described with regard to FIG. 9.

Figure 10:
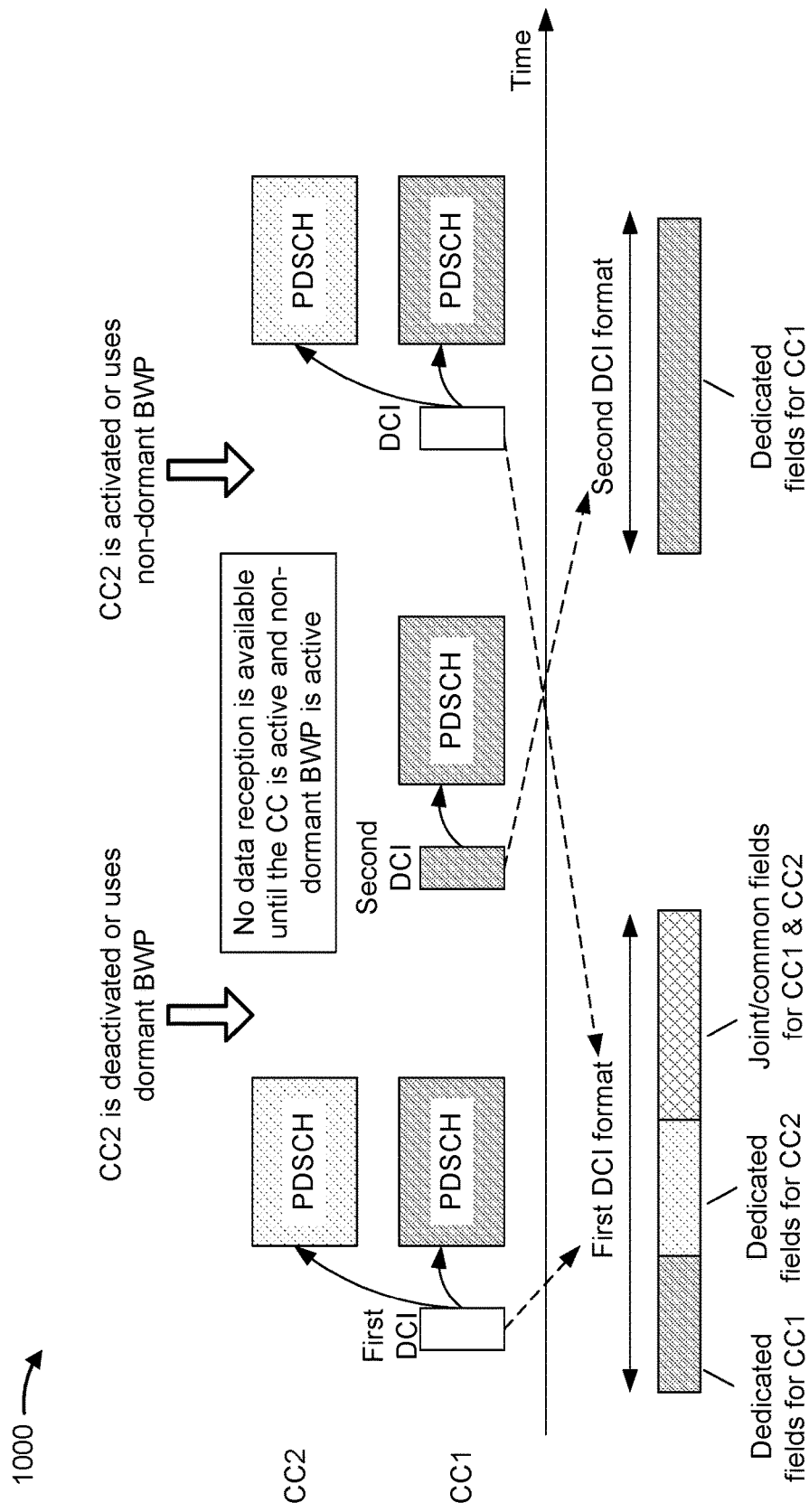

FIG. 10 is a diagram illustrating an example 1000 of managing deactivation or dormancy of a CC in cross CC or multiple CC scheduling, in accordance with the present disclosure. As shown, the UE may identify the DCI format type the UE needs to monitor based on whether a scheduled CC by the DCI format is active or deactivated, or whether the BWP of the scheduled CC by the DCI format is a non-dormant BWP or a dormant BWP. In some aspects, the first DCI format may have a first format type and the second DCI format may have a second format type. The first format type may correspond to multiple CC scheduling and the second format type may correspond to single CC scheduling. In some aspects, the second format type may include a legacy DCI format 1_0, a legacy DCI format 1_1, or a legacy DCI format 1_2.

As indicated above, FIG. 10 is provided as an example. Other examples may differ from what is described with regard to FIG. 10.

Figure 11:
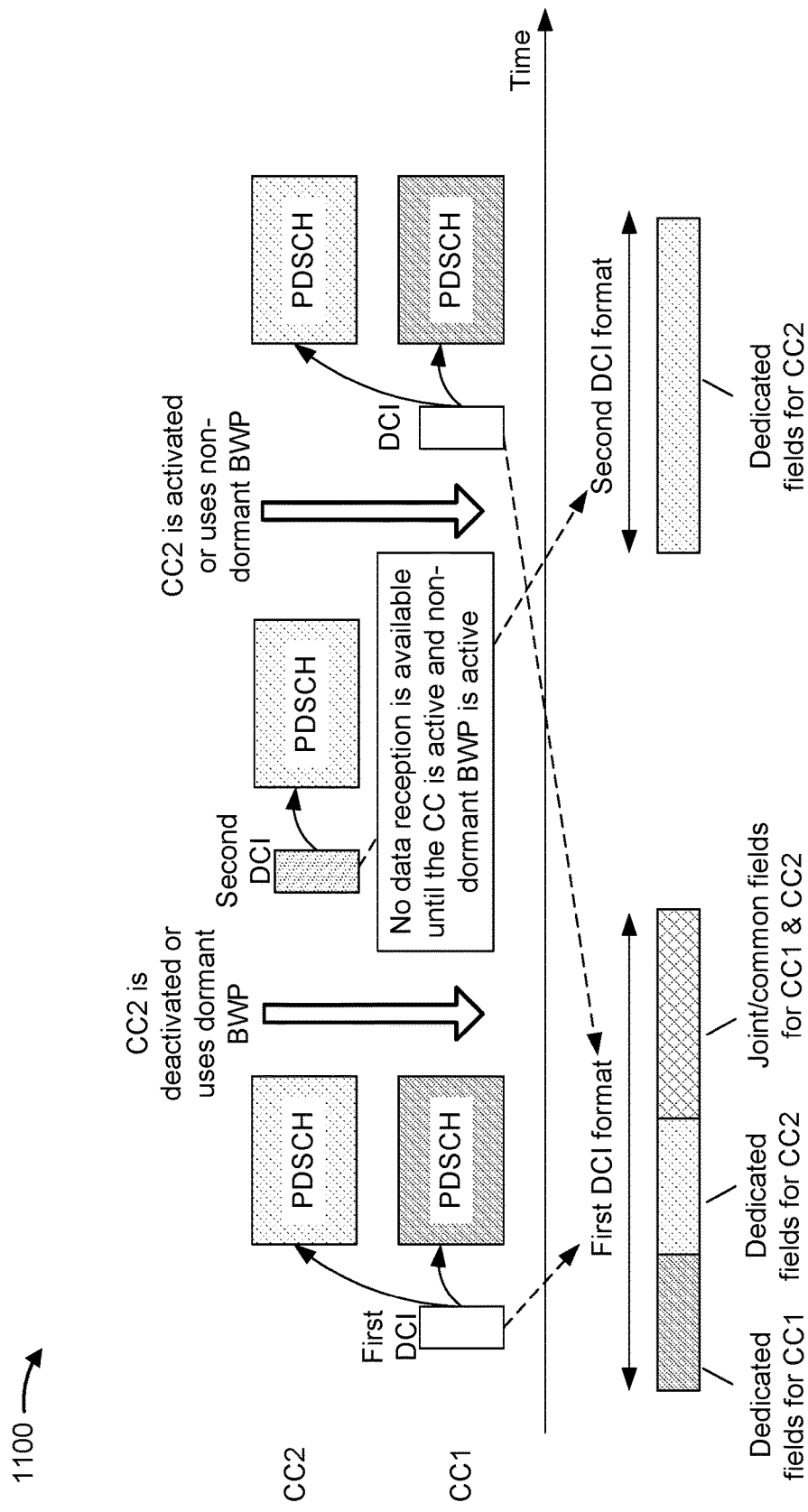

FIG. 11 is a diagram illustrating an example 1100 of managing deactivation or dormancy of a CC in cross CC or multiple CC scheduling, in accordance with the present disclosure. As shown, the UE may identify the CC the UE is to monitor based at least in part on whether the scheduling CC is active or deactivated, or whether the BWP of the scheduling CC is a non-dormant BWP or a dormant BWP. The first DCI format may have a first format type and the second DCI format may have a second format type that is different than the first format type. In some aspects, as shown, the first format type may correspond to multiple CC scheduling or cross-CC scheduling, and the second format type may correspond to single CC scheduling.

As indicated above, FIG. 11 is provided as an example. Other examples may differ from what is described with regard to FIG. 11.

Figure 12:
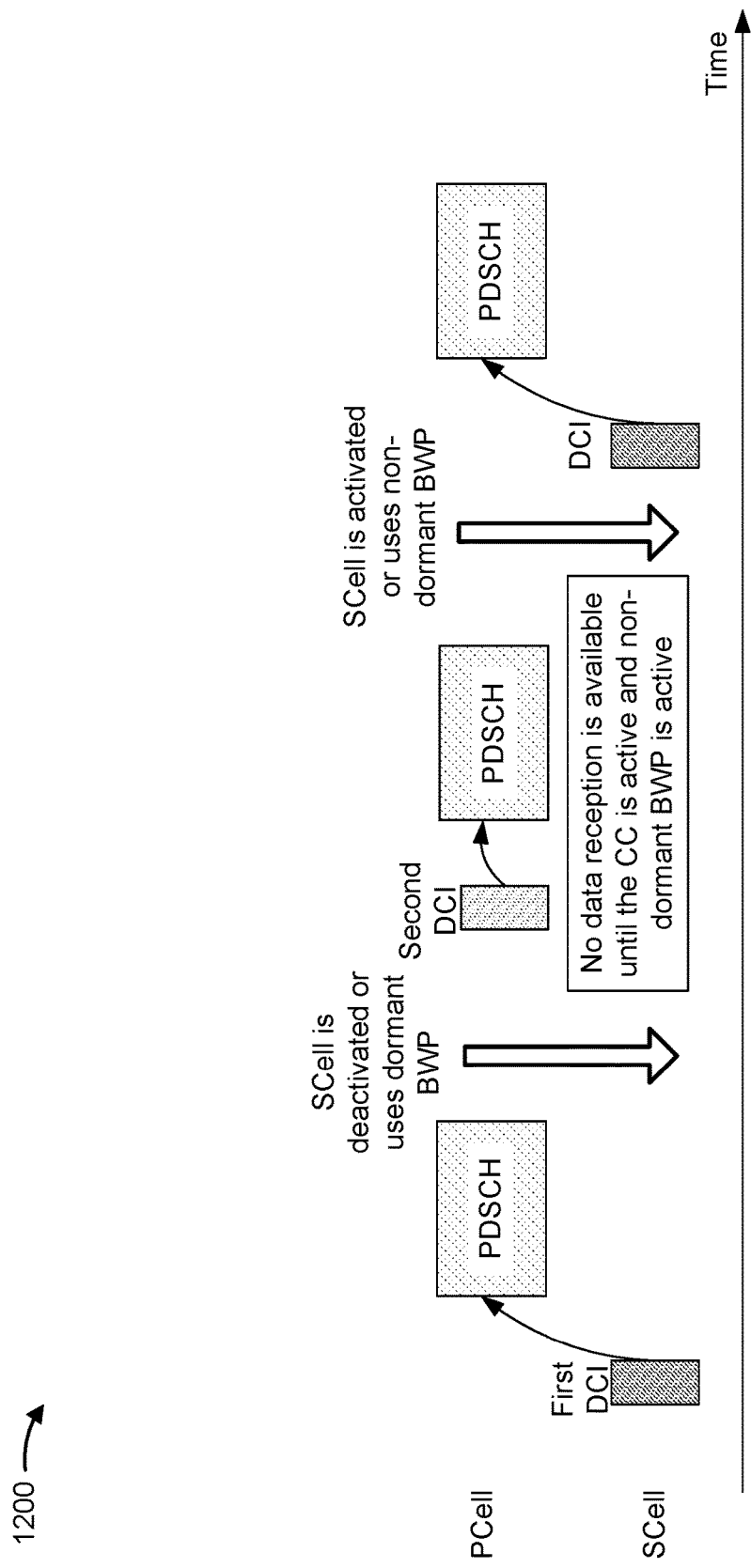

FIG. 12 is a diagram illustrating an example 1200 of managing deactivation or dormancy of a CC in cross CC or multiple CC scheduling, in accordance with the present disclosure. As shown by FIG. 12, the concept illustrated in FIG. 11 may also apply in the context of a first DCI format that facilitates cross CC scheduling from a secondary cell to a primary cell. As shown, the UE may identify the CC the UE is to monitor based at least in part on whether the scheduling CC is active or deactivated, or whether the BWP of the scheduling CC is a non-dormant BWP or a dormant BWP. The first DCI format may have a first format type and the second DCI format may have a second format type that is different than the first format type. In some aspects, as shown, the first format type may correspond to cross CC scheduling, and the second format type may correspond to single CC scheduling.

As indicated above, FIG. 12 is provided as an example. Other examples may differ from what is described with regard to FIG. 12.

Figure 13:
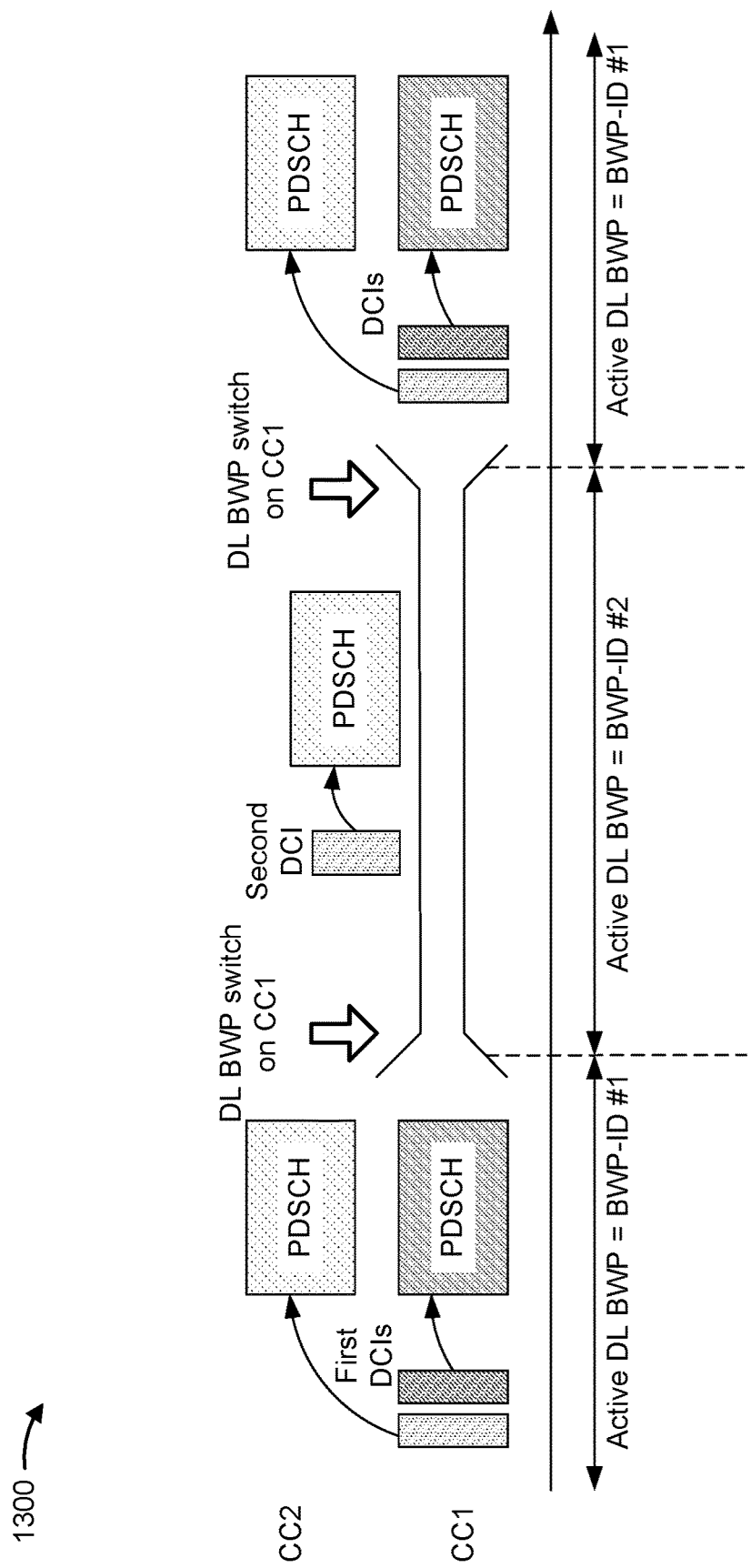

FIG. 13 is a diagram illustrating an example 1300 of managing deactivation or dormancy of a CC in cross CC or multiple CC scheduling, in accordance with the present disclosure. As shown by FIG. 13, aspects of the techniques for managing deactivation or dormancy of a CC described above may be applicable in scenarios in which a PDCCH monitoring behavior is changed depending on whether the scheduling and/or scheduled CC is active, or whether the active DL BWP of the scheduling and/or scheduled CC satisfies one or more conditions.

For example, in some aspects, the UE may determine that the PDCCH monitoring behavior switch condition is satisfied based at least in part on determining that an active downlink BWP satisfies a BWP switching condition. As shown, the UE may determine that the active downlink BWP satisfies the BWP switching condition by determining that a bandwidth of the active downlink BWP satisfies a bandwidth threshold. In some aspects, the UE may determine that the active downlink BWP satisfies the BWP switching condition by determining that an achievable downlink data rate associated with the active downlink BWP satisfies a threshold, determining that a BWP identifier associated with the active downlink BWP is identified as a non-scheduling BWP, and/or the like.

In some aspects, as shown in FIG. 13, the UE may monitor, using a second PDCCH monitoring behavior for the second DCI format. In some aspects, the UE may monitor a second PDCCH for the second format, where the second PDCCH corresponds to the first CC or a third CC. In some aspects, the first DCI format may include a first format type and the second DCI format may include a second format type that is different than the first format type. The first format type may correspond to multiple CC scheduling or cross-CC scheduling and the second format type may correspond to single CC scheduling.

As indicated above, FIG. 13 is provided as an example. Other examples may differ from what is described with regard to FIG. 13.

Figure 14:
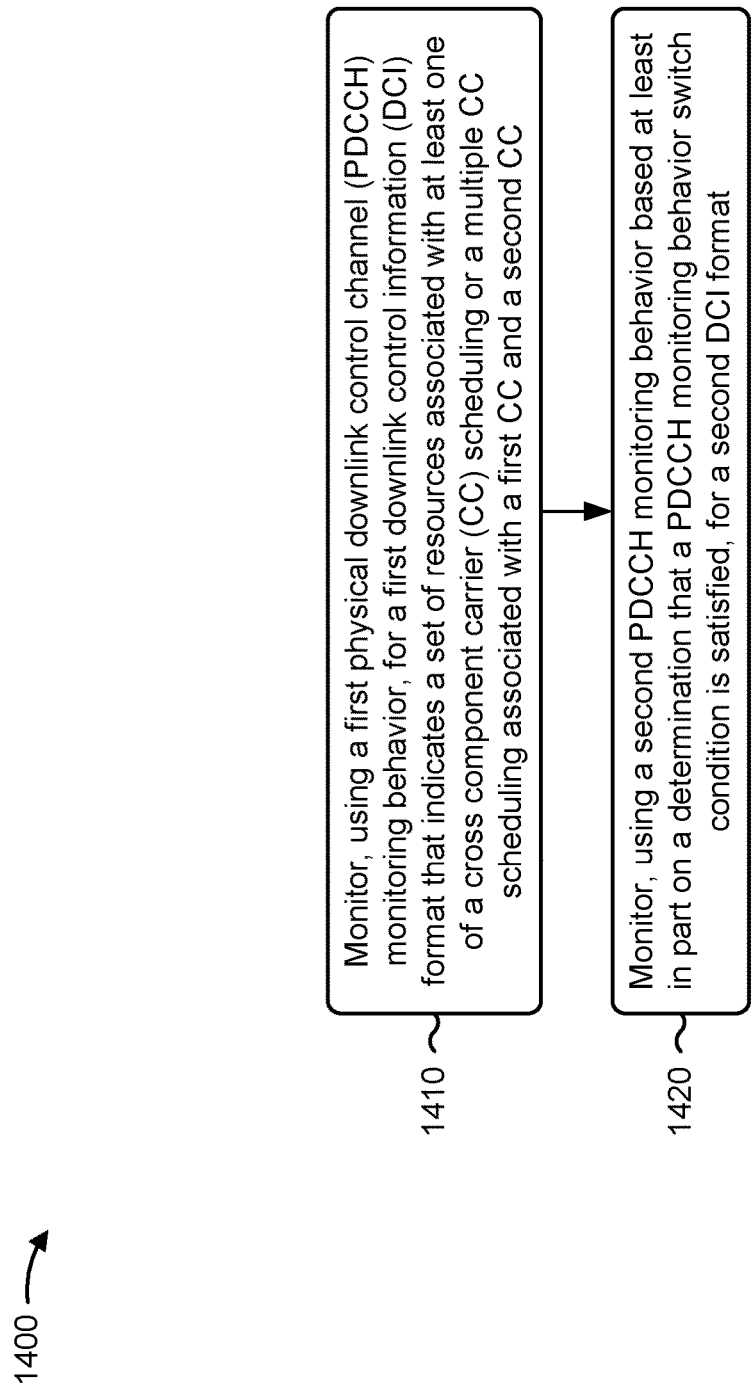
FIGS. 14 and 15 are diagrams illustrating example processes associated with managing deactivation or dormancy of a CC in cross CC or multiple CC scheduling, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with managing deactivation or dormancy of a CC in cross CC or multiple CC scheduling.

As shown in FIG. 14, in some aspects, process 1400 may include monitoring, using a first PDCCH monitoring behavior, for a first DCI format that indicates a set of resources associated with at least one of a cross CC scheduling or a multiple CC scheduling associated with a first CC and a second CC (block 1410). For example, the UE (e.g., using reception component 1602 of FIG. 16) may monitor, using a first PDCCH monitoring behavior, for a first DCI format that indicates a set of resources associated with at least one of a cross CC scheduling or a multiple CC scheduling associated with a first CC and a second CC, as described above.

As further shown in FIG. 14, in some aspects, process 1400 may include monitoring, using a second PDCCH monitoring behavior based at least in part on a determination that a PDCCH monitoring behavior switch condition is satisfied, for a second DCI format (block 1420). For example, the UE (e.g., using reception component 1602 of FIG. 16) may monitor, using a second PDCCH monitoring behavior based at least in part on a determination that a PDCCH monitoring behavior switch condition is satisfied, for a second DCI format, as described above.

Process 1400 may include additional aspects, such as any single aspect or any combination of aspects described below and/or in connection with one or more other processes described elsewhere herein.

In a first aspect, process 1400 includes determining (e.g., using determining component 1608 of FIG. 16) that the PDCCH monitoring behavior switch condition is satisfied, where determining that the PDCCH monitoring behavior switch condition is satisfied comprises determining that the second CC is deactivated, determining that an active BWP of the second CC is a dormant BWP, or determining that an active downlink BWP satisfies a BWP switching condition, where the active downlink BWP is associated with at least one of the first CC or the second CC.

In a second aspect, alone or in combination with the first aspect, the first CC is associated with a primary cell and the second CC is associated with a secondary cell.

In a third aspect, alone or in combination with one or more of the first and second aspects, the second DCI format is different than the first DCI format, and at least one characteristic of the second DCI format is based at least in part on determining that the PDCCH monitoring behavior switch condition is satisfied.

In a fourth aspect, alone or in combination with one or more of the first through third aspects, the at least one characteristic of the second DCI format comprises at least one of a set of contents of the second DCI format, a size of the second DCI format, or a format type corresponding to the second DCI format.

In a fifth aspect, alone or in combination with one or more of the first through fourth aspects, the format type corresponding to the second DCI format matches a format type corresponding to the first DCI format, and the at least one characteristic of the second DCI format comprises at least one of the set of contents of the second DCI format or the size of the second DCI format.

In a sixth aspect, alone or in combination with one or more of the first through fifth aspects, the at least one characteristic of the second DCI format comprises the set of contents of the second DCI format, and the set of resources are associated with the multiple CC scheduling.

In a seventh aspect, alone or in combination with one or more of the first through sixth aspects, the at least one characteristic of the second DCI format comprises the set of contents of the second DCI format and the size of the second DCI format, wherein the set of resources are associated with the multiple CC scheduling.

In an eighth aspect, alone or in combination with one or more of the first through seventh aspects, monitoring using the first PDCCH monitoring behavior comprises monitoring a first PDCCH associated with the first CC, and monitoring using the second PDCCH monitoring behavior comprises monitoring a second PDCCH associated with the second CC.

In a ninth aspect, alone or in combination with one or more of the first through eighth aspects, process 1400 includes receiving a configuration indicating the first DCI format and the second DCI format.

In a tenth aspect, alone or in combination with one or more of the first through ninth aspects, process 1400 includes determining that the PDCCH monitoring behavior switch condition is satisfied by determining that the second CC is deactivated or determining that an active BWP of the second CC is a dormant BWP, where the first DCI format includes a set of dedicated data fields associated with the second CC, and where, in the first DCI format, the set of dedicated data fields associated with the second CC include PDSCH scheduling information corresponding to the second CC, and where the second DCI format includes the set of dedicated data fields associated with the second CC, and where, in the second DCI format, the set of dedicated data fields associated with the second CC do not include the PDSCH scheduling information.

In an eleventh aspect, alone or in combination with one or more of the first through tenth aspects, in the second DCI format, the set of dedicated data fields associated with the second CC are fixed to a particular value.

In a twelfth aspect, alone or in combination with one or more of the first through eleventh aspects, a payload size of the first DCI format is equal to a payload size of the second DCI format.

In a thirteenth aspect, alone or in combination with one or more of the first through twelfth aspects, in the first DCI format, the set of dedicated data fields associated with the second CC indicate at least one of a frequency domain resource allocation, a time domain resource allocation, a modulation and coding scheme, a hybrid automatic repeat request process identifier, a redundancy version, a transmitted precoding matrix indicator, or an antenna port.

In a fourteenth aspect, alone or in combination with one or more of the first through thirteenth aspects, process 1400 includes determining that the PDCCH monitoring behavior switch condition is satisfied by determining that the second CC is deactivated or determining that an active BWP of the second CC is a dormant BWP, where the first DCI format includes a set of dedicated data fields associated with the second CC, and where, in the first DCI format, the set of dedicated data fields associated with the second CC include PDSCH scheduling information corresponding to the second CC, and where the second DCI format does not include the set of dedicated data fields associated with the second CC.

In a fifteenth aspect, alone or in combination with one or more of the first through fourteenth aspects, the first DCI format has a first payload size and the second DCI format has a second payload size that is smaller than the first payload size.

In a sixteenth aspect, alone or in combination with one or more of the first through fifteenth aspects, in the first DCI format, the set of dedicated data fields associated with the second CC indicate at least one of a frequency domain resource allocation, a time domain resource allocation, an MCS, a HARQ process ID, an RV, a TPMI, or an antenna port.

In a seventeenth aspect, alone or in combination with one or more of the first through sixteenth aspects, process 1400 includes determining that the PDCCH monitoring behavior switch condition is satisfied by determining that the second CC is deactivated, or determining that an active BWP of the second CC is a dormant BWP, where the first DCI format has a first format type and the second DCI format has a second format type.

In an eighteenth aspect, alone or in combination with one or more of the first through seventeenth aspects, the first format type corresponds to multiple CC scheduling and the second format type corresponds to single CC scheduling.

In a nineteenth aspect, alone or in combination with one or more of the first through eighteenth aspects, the second format type comprises a legacy DCI format 1_0, a legacy DCI format 1_1, or a legacy DCI format 1_2.

In a twentieth aspect, alone or in combination with one or more of the first through nineteenth aspects, monitoring, using the first PDCCH monitoring behavior, for the first DCI format comprises monitoring a first PDCCH for the first DCI format, where the first PDCCH corresponds to the second CC, and where monitoring, using the second PDCCH monitoring behavior, for the second DCI format comprises monitoring a second PDCCH for the second DCI format, where the second PDCCH corresponds to the first CC.

In a twenty-first aspect, alone or in combination with one or more of the first through twentieth aspects, process 1400 includes determining that the PDCCH monitoring behavior switch condition is satisfied by determining that the second CC is deactivated, or determining that an active BWP of the second CC is a dormant BWP.

In a twenty-second aspect, alone or in combination with one or more of the first through twenty-first aspects, the first DCI format has a first format type and the second DCI format has a second format type that is different than the first format type.

In a twenty-third aspect, alone or in combination with one or more of the first through twenty-second aspects, the first format type corresponds to multiple CC scheduling or cross-CC scheduling, and wherein the second format type corresponds to single CC scheduling.

In a twenty-fourth aspect, alone or in combination with one or more of the first through twenty-third aspects, the second format type comprises a legacy DCI format 1_0, a legacy DCI format 1_1, or a legacy DCI format 1_2.

In a twenty-fifth aspect, alone or in combination with one or more of the first through twenty-fourth aspects, process 1400 includes determining that the PDCCH monitoring behavior switch condition is satisfied, wherein determining that the PDCCH monitoring behavior switch condition is satisfied comprises determining that an active downlink BWP satisfies a BWP switching condition, wherein the active downlink BWP is associated with at least one of the first CC or the second CC.

In a twenty-sixth aspect, alone or in combination with one or more of the first through twenty-fifth aspects, the active downlink BWP is associated with the second CC, where the first DCI format is associated with cross-carrying scheduling, where monitoring, using the first PDCCH monitoring behavior for the first DCI format, comprises monitoring a first PDCCH for the first DCI format, where the first PDCCH corresponds to the second CC, and where monitoring, using the second PDCCH monitoring behavior for the second DCI format, comprises monitoring a second PDCCH for the second format, where the second PDCCH corresponds to the first CC or a third CC.

In a twenty-seventh aspect, alone or in combination with one or more of the first through twenty-sixth aspects, the first DCI format has a first format type and the second DCI format has a second format type that is different than the first format type.

In a twenty-eighth aspect, alone or in combination with one or more of the first through twenty-seventh aspects, the first format type corresponds to multiple CC scheduling or cross-CC scheduling, and the second format type corresponds to single CC scheduling.

In a twenty-ninth aspect, alone or in combination with one or more of the first through twenty-eighth aspects, the second format type comprises a legacy DCI format 1_0, a legacy DCI format 1_1, or a legacy DCI format 1_2.

In a thirtieth aspect, alone or in combination with one or more of the first through twenty-ninth aspects, the second PDCCH corresponds to the third CC and the second DCI format corresponds to cross-CC scheduling.

In a thirty-first aspect, alone or in combination with one or more of the first through thirtieth aspects, determining that the active downlink BWP satisfies the BWP switching condition comprises at least one of determining that a bandwidth of the active downlink BWP satisfies a bandwidth threshold, determining that an achievable downlink data rate associated with the active downlink BWP satisfies a threshold, or determining that a BWP identifier associated with the active downlink BWP is identified as a non-scheduling BWP.

In a thirty-second aspect, alone or in combination with one or more of the first through thirty-first aspects, the achievable downlink data rate is based at least in part on at least one of a subcarrier spacing associated with the active downlink BWP, a number of resource blocks associated with the active downlink BWP, a number of layers associated with the active downlink BWP, a maximum MCS value associated with the active downlink BWP, or an overhead factor associated with the active downlink BWP.

In a thirty-third aspect, alone or in combination with one or more of the first through thirty-second aspects, process 1400 includes receiving a list of non-scheduling BWPs, wherein determining that the BWP identifier associated with the active downlink BWP is identified as a non-scheduling BWP comprises determining that the BWP identifier is included in the list.

In a thirty-fourth aspect, alone or in combination with one or more of the first through thirty-third aspects, the active downlink BWP is associated with a scheduling CC, where the scheduling CC comprises a secondary cell, and where determining that the BWP identifier associated with the active downlink BWP is identified as a non-scheduling BWP comprises determining that the active downlink BWP is a dormant BWP.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
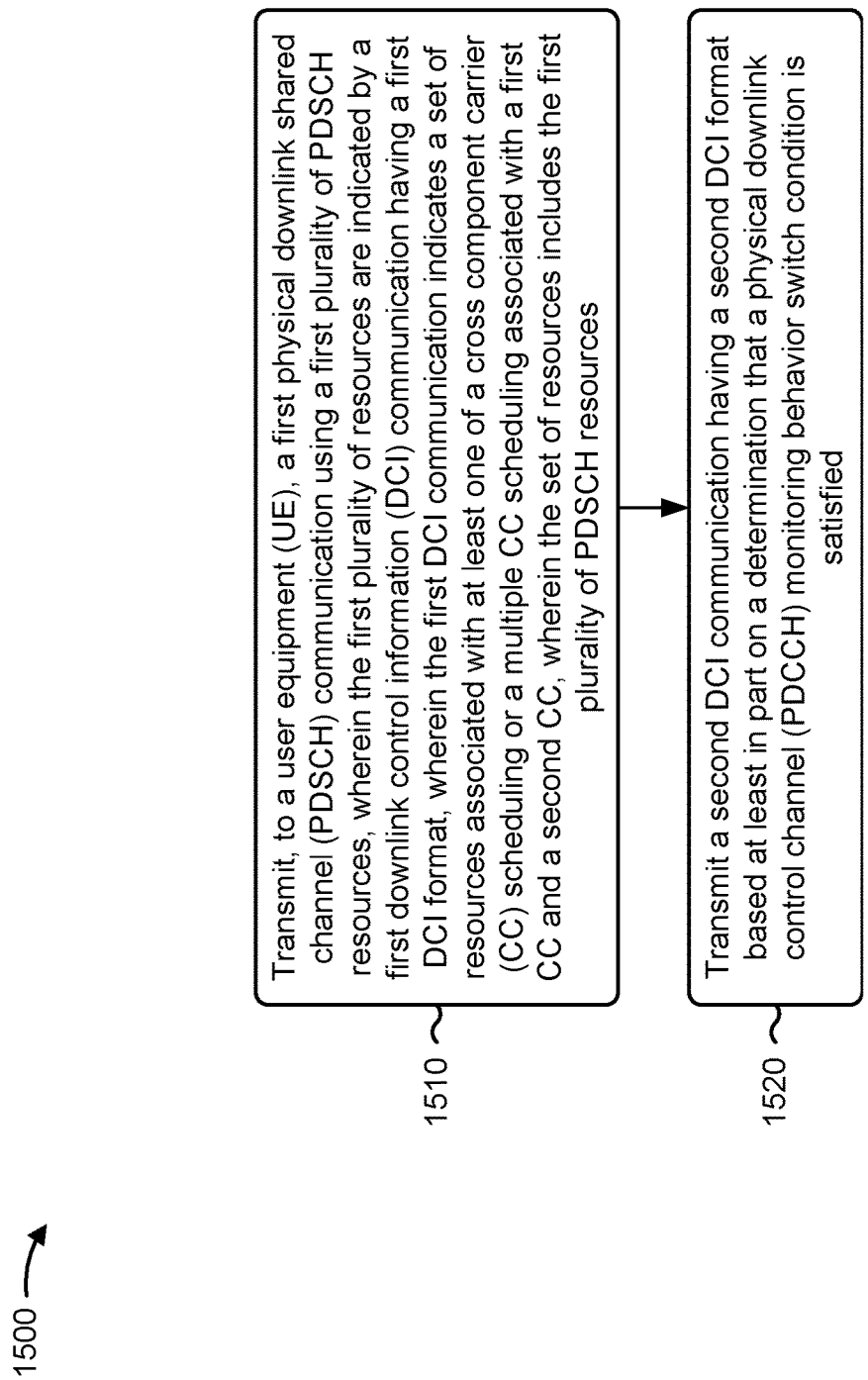

FIG. 15 is a diagram illustrating an example process 1500 performed, for example, by a base station, in accordance with the present disclosure. Example process 1500 is an example where the base station (e.g., base station 110) performs operations associated with managing deactivation or dormancy of a CC in cross CC or multiple CC scheduling.

As shown in FIG. 15, in some aspects, process 1500 may include transmitting, to a UE, a first PDSCH communication using a first plurality of PDSCH resources, where the first plurality of resources are indicated by a first DCI communication having a first DCI format, where the first DCI communication indicates a set of resources associated with at least one of a cross CC scheduling or a multiple CC scheduling associated with a first CC and a second CC, wherein the set of resources includes the first plurality of PDSCH resources (block 1510). For example, the base station (e.g., using transmission component 1704 of FIG. 17) may transmit, to a UE, a first PDSCH communication using a first plurality of PDSCH resources, where the first plurality of resources are indicated by a first DCI communication having a first DCI format, where the first DCI communication indicates a set of resources associated with at least one of a cross CC scheduling or a multiple CC scheduling associated with a first CC and a second CC, where the set of resources includes the first plurality of PDSCH resources, as described above.

As further shown in FIG. 15, in some aspects, process 1500 may include transmitting a second DCI communication having a second DCI format based at least in part on a determination that a PDCCH monitoring behavior switch condition is satisfied (block 1520). For example, the base station (e.g., using transmission component 1704 of FIG. 14) may transmit a second DCI communication having a second DCI format based at least in part on a determination that a PDCCH monitoring behavior switch condition is satisfied, as described above.

Process 1500 may include additional aspects, such as any single aspect or any combination of aspects described below and/or in connection with one or more other processes described elsewhere herein.

In a first aspect, process 1500 includes transmitting, to the UE, a configuration that indicates the first DCI format and the second DCI format.

In a second aspect, alone or in combination with the first aspect, process 1500 includes determining that the PDCCH monitoring behavior switch condition is satisfied, wherein determining that the PDCCH monitoring behavior switch condition is satisfied comprises determining that the second CC is deactivated, determining that an active BWP of the second CC is a dormant BWP, or determining that an active downlink BWP satisfies a BWP switching condition, where the active downlink BWP is associated with at least one of the first CC or the second CC.

In a third aspect, alone or in combination with one or more of the first and second aspects, the first CC is associated with a primary cell and the second CC is associated with a secondary cell.

In a fourth aspect, alone or in combination with one or more of the first through third aspects, the second DCI format is different than the first DCI format, and at least one characteristic of the second DCI format is based at least in part on the determination that the PDCCH monitoring behavior switch condition is satisfied.

In a fifth aspect, alone or in combination with one or more of the first through fourth aspects, the at least one characteristic of the second DCI format comprises at least one of a set of contents of the second DCI format, a size of the second DCI format, or a format type corresponding to the second DCI format.

In a sixth aspect, alone or in combination with one or more of the first through fifth aspects, the format type corresponding to the second DCI format matches a format type corresponding to the first DCI format, and the at least one characteristic of the second DCI format comprises at least one of the set of contents of the second DCI format or the size of the second DCI format.

In a seventh aspect, alone or in combination with one or more of the first through sixth aspects, the at least one characteristic of the second DCI format comprises the set of contents of the second DCI format, and the set of resources are associated with the multiple CC scheduling.

In an eighth aspect, alone or in combination with one or more of the first through seventh aspects, the at least one characteristic of the second DCI format comprises the set of contents of the second DCI format and the size of the second DCI format, and the set of resources are associated with the multiple CC scheduling.

In a ninth aspect, alone or in combination with one or more of the first through eighth aspects, the base station provides the first CC, wherein the first CC comprises a scheduling CC, and wherein the method further comprises transmitting the first DCI communication, wherein the set of resources are associated with multiple CC scheduling, and wherein the set of resources includes a second plurality of PDSCH resources associated with the second CC, and the determination that the PDCCH monitoring behavior switch condition is satisfied is based at least in part on a determination that the second CC is deactivated or a determination that an active BWP of the second CC is a dormant BWP.

In a tenth aspect, alone or in combination with one or more of the first through ninth aspects, the first DCI format includes a set of dedicated data fields associated with the second CC, and where, in the first DCI format, the set of dedicated data fields associated with the second CC include PDSCH scheduling information, where the PDSCH scheduling information indicates the second plurality of PDSCH resources.

In an eleventh aspect, alone or in combination with one or more of the first through tenth aspects, in the first DCI format, the set of dedicated data fields associated with the second CC indicate at least one of a frequency domain resource allocation, a time domain resource allocation, an MCS, a HARQ process ID, an RV, a TPMI, or an antenna port.

In a twelfth aspect, alone or in combination with one or more of the first through eleventh aspects, the second DCI format includes the set of dedicated data fields associated with the second CC, and where, in the second DCI format, the set of dedicated data fields associated with the second CC do not include the PDSCH scheduling information.

In a thirteenth aspect, alone or in combination with one or more of the first through twelfth aspects, in the second DCI format, the set of dedicated data fields associated with the second CC are fixed to a particular value.

In a fourteenth aspect, alone or in combination with one or more of the first through thirteenth aspects, a payload size of the first DCI format is equal to a payload size of the second DCI format.

In a fifteenth aspect, alone or in combination with one or more of the first through fourteenth aspects, the second DCI format does not include the set of dedicated data fields associated with the second CC.

In a sixteenth aspect, alone or in combination with one or more of the first through fifteenth aspects, the first DCI format has a first payload size and the second DCI format has a second payload size that is smaller than the first payload size.

In a seventeenth aspect, alone or in combination with one or more of the first through sixteenth aspects, the second DCI format has a second format type.

In an eighteenth aspect, alone or in combination with one or more of the first through seventeenth aspects, the second format type corresponds to single CC scheduling.

In a nineteenth aspect, alone or in combination with one or more of the first through eighteenth aspects, the second format type comprises a legacy DCI format 1_0, a legacy DCI format 1_1, or a legacy DCI format 1_2.

In a twentieth aspect, alone or in combination with one or more of the first through nineteenth aspects, the second DCI communication indicates an additional set of resources that include a third plurality of PDSCH resources associated with the first CC.

In a twenty-first aspect, alone or in combination with one or more of the first through twentieth aspects, the base station provides the second CC, where the second CC comprises a scheduled CC that includes the first plurality of PDSCH resources, and where the determination that the PDCCH monitoring behavior switch condition is satisfied is based at least in part on a determination that the first CC is deactivated, or determining that an active BWP of the first CC is a dormant BWP.

In a twenty-second aspect, alone or in combination with one or more of the first through twenty-first aspects, the first DCI format has a first format type and the second DCI format has a second format type that is different than the first format type.

In a twenty-third aspect, alone or in combination with one or more of the first through twenty-second aspects, the first format type corresponds to multiple CC scheduling or cross-CC scheduling and the second format type corresponds to single CC scheduling.

In a twenty-fourth aspect, alone or in combination with one or more of the first through twenty-third aspects, the second format type comprises a legacy DCI format 1_0, a legacy DCI format 1_1, or a legacy DCI format 1_2.

In a twenty-fifth aspect, alone or in combination with one or more of the first through twenty-fourth aspects, the second DCI communication indicates an additional set of resources that include a third plurality of PDSCH resources associated with the second CC.

In a twenty-sixth aspect, alone or in combination with one or more of the first through twenty-fifth aspects, the base station provides the second CC, where the second CC comprises a scheduled CC that includes the first plurality of PDSCH resources, and where the determination that the PDCCH monitoring behavior switch condition is satisfied is based at least in part on a determination that an active downlink BWP satisfies a BWP switching condition, where the active downlink BWP is associated with the first CC.

In a twenty-seventh aspect, alone or in combination with one or more of the first through twenty-sixth aspects, the first DCI format has a first format type and the second DCI format has a second format type that is different than the first format type.

In a twenty-eighth aspect, alone or in combination with one or more of the first through twenty-seventh aspects, the first format type corresponds to cross-CC scheduling and the second format type corresponds to single CC scheduling.

In a twenty-ninth aspect, alone or in combination with one or more of the first through twenty-eighth aspects, the second format type comprises a legacy DCI format 1_0, a legacy DCI format 1_1, or a legacy DCI format 1_2.

In a thirtieth aspect, alone or in combination with one or more of the first through twenty-ninth aspects, the determination that the active downlink BWP satisfies the BWP switching condition is based at least in part on at least one of a determination that a bandwidth of the active downlink BWP satisfies a bandwidth threshold, a determination that an achievable downlink data rate associated with the active downlink BWP satisfies a threshold, or a determination that a BWP identifier associated with the active downlink BWP is identified as a non-scheduling BWP.

In a thirty-first aspect, alone or in combination with one or more of the first through thirtieth aspects, the achievable downlink data rate is based at least in part on at least one of a subcarrier spacing associated with the active downlink BWP, a number of resource blocks associated with the active downlink BWP, a number of layers associated with the active downlink BWP, a maximum MCS value associated with the active downlink BWP, or an overhead factor associated with the active downlink BWP.

In a thirty-second aspect, alone or in combination with one or more of the first through thirty-first aspects, the determination that the BWP identifier associated with the active downlink BWP is identified as a non-scheduling BWP is based at least in part on a determination that the BWP identifier is included in a list of non-scheduling BWPs.

In a thirty-third aspect, alone or in combination with one or more of the first through thirty-second aspects, the first CC is a scheduling CC, where the scheduling CC is a secondary cell, and the determination that the BWP identifier associated with the active downlink BWP is identified as a non-scheduling BWP is based at least in part on a determination that the active downlink BWP is a dormant BWP.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
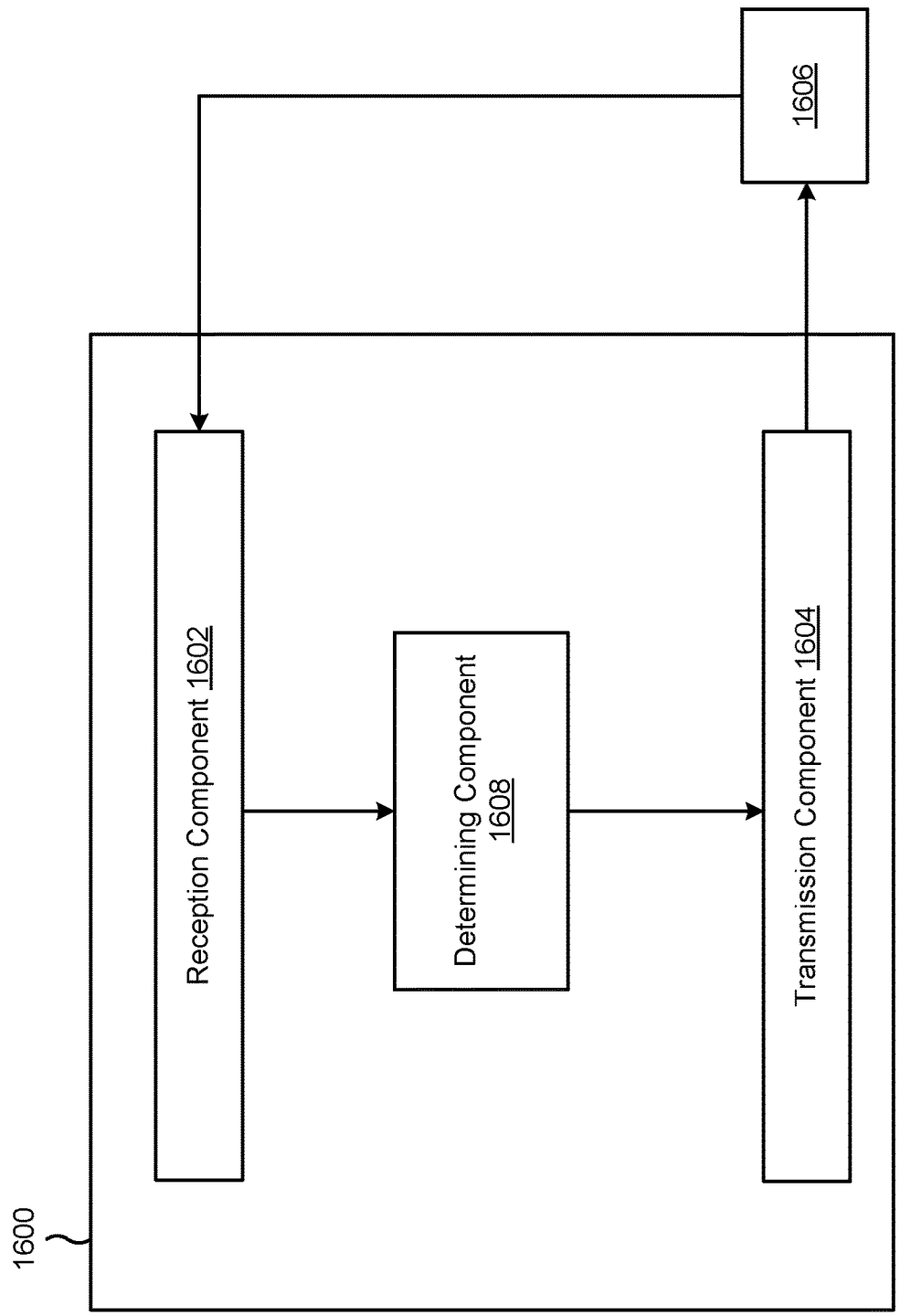
FIGS. 16 and 17 are block diagrams of example apparatuses for wireless communication, in accordance with the present disclosure.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a determining component 1608, among other examples.

In some aspects, the apparatus 1600 may be configured to perform one or more operations described herein in connection with FIGS. 7-13. Additionally, or alternatively, the apparatus 1600 may be configured to perform one or more processes described herein, such as process 1400 of FIG. 14.

In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be collocated with the reception component 1602 in a transceiver.

The reception component 1602 may monitor, using a first PDCCH monitoring behavior, for a first DCI format that indicates a set of resources associated with at least one of a cross CC scheduling or a multiple CC scheduling associated with a first CC and a second CC. The reception component 1602 may monitor, using a second PDCCH monitoring behavior based at least in part on a determination that a PDCCH monitoring behavior switch condition is satisfied, for a second DCI format.

The transmission component 1604 may transmit, to a UE, a first PDSCH communication using a first plurality of PDSCH resources, where the first plurality of resources are indicated by a first DCI communication having a first DCI format, where the first DCI communication indicates a set of resources associated with at least one of a cross CC scheduling or a multiple CC scheduling associated with a first CC and a second CC, where the set of resources includes the first plurality of PDSCH resources. The transmission component 1604 may transmit a second DCI communication having a second DCI format based at least in part on a determination that a PDCCH monitoring behavior switch condition is satisfied.

The determining component may determine that a PDCCH monitoring behavior switch condition is satisfied. For example, in some aspects, the determining component 1608 may determine that the PDCCH monitoring behavior switch condition is satisfied by determining that the second CC is deactivated, determining that an active BWP of the second CC is a dormant BWP, or determining that an active downlink BWP satisfies a BWP switching condition, where the active downlink BWP is associated with at least one of the first CC or the second CC. The determining component 1608 may include a memory. In some aspects, the determining component 1608 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
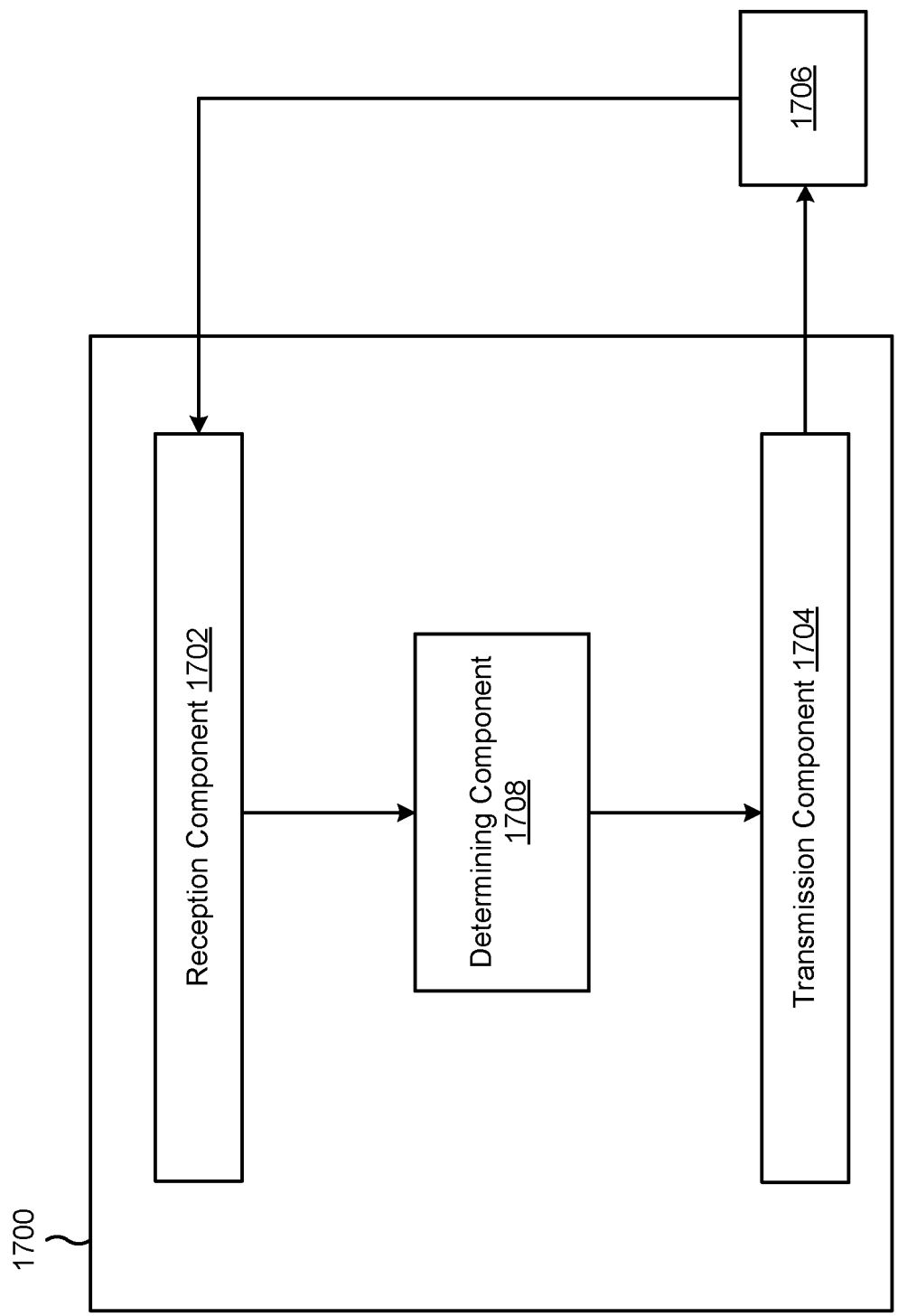

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of a determining component 1708, among other examples.

In some aspects, the apparatus 1700 may be configured to perform one or more operations described herein in connection with FIGS. 7-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be collocated with the reception component 1702 in a transceiver.

The transmission component 1704 may transmit, to a UE, a first PDSCH communication using a first plurality of PDSCH resources, where the first plurality of resources are indicated by a first DCI communication having a first DCI format, where the first DCI communication indicates a set of resources associated with at least one of a cross CC scheduling or a multiple CC scheduling associated with a first CC and a second CC, where the set of resources includes the first plurality of PDSCH resources. The transmission component 1704 may transmit a second DCI communication having a second DCI format based at least in part on a determination that a PDCCH monitoring behavior switch condition is satisfied.

The determining component 1708 may determine that a PDCCH monitoring behavior switch condition is satisfied. For example, in some aspects, the determining component 1708 may determine that the PDCCH monitoring behavior switch condition is satisfied by determining that the second CC is deactivated, determining that an active BWP of the second CC is a dormant BWP, or determining that an active downlink BWP satisfies a BWP switching condition, where the active downlink BWP is associated with at least one of the first CC or the second CC. The determining component 1708 may include a memory. In some aspects, the determining component 1708 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 1704 may transmit, to a user equipment, a first PDSCH communication using a first plurality of PDSCH resources, wherein the first plurality of resources are indicated by a first DCI communication having a first DCI format, wherein the first DCI communication indicates a set of resources associated with at least one of a cross CC scheduling or a multiple CC scheduling associated with a first CC and a second CC, wherein the set of resources includes the first plurality of PDSCH resources. The transmission component 1704 may transmit a second DCI communication having a second DCI format based at least in part on a determination that a PDCCH monitoring behavior switch condition is satisfied The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: monitoring, using a first physical downlink control channel (PDCCH) monitoring behavior, for a first downlink control information (DCI) format that indicates a set of resources associated with at least one of a cross component carrier (CC) scheduling or a multiple CC scheduling associated with a first CC and a second CC; and monitoring, using a second PDCCH monitoring behavior based at least in part on a determination that a PDCCH monitoring behavior switch condition is satisfied, for a second DCI format.

Aspect 2: The method of Aspect 1, further comprising determining that the PDCCH monitoring behavior switch condition is satisfied, wherein determining that the PDCCH monitoring behavior switch condition is satisfied comprises: determining that the second CC is deactivated, determining that an active bandwidth part (BWP) of the second CC is a dormant BWP, or determining that an active downlink BWP satisfies a BWP switching condition, wherein the active downlink BWP is associated with at least one of the first CC or the second CC.

Aspect 3: The method of Aspect 2, wherein the first CC is associated with a primary cell and the second CC is associated with a secondary cell.

Aspect 4: The method of any of Aspects 1-3, wherein the second DCI format is different than the first DCI format, and wherein at least one characteristic of the second DCI format is based at least in part on determining that the PDCCH monitoring behavior switch condition is satisfied.

Aspect 5: The method of Aspect 4, wherein the at least one characteristic of the second DCI format comprises at least one of: a set of contents of the second DCI format, a size of the second DCI format, or a format type corresponding to the second DCI format.

Aspect 6: The method of Aspect 5, wherein the format type corresponding to the second DCI format matches a format type corresponding to the first DCI format, and wherein the at least one characteristic of the second DCI format comprises at least one of the set of contents of the second DCI format or the size of the second DCI format.

Aspect 7: The method of either of Aspects 5 or 6, wherein the at least one characteristic of the second DCI format comprises the set of contents of the second DCI format, and wherein the set of resources are associated with the multiple CC scheduling.

Aspect 8: The method of either of Aspects 5 or 6, wherein the at least one characteristic of the second DCI format comprises the set of contents of the second DCI format and the size of the second DCI format, and wherein the set of resources are associated with the multiple CC scheduling.

Aspect 9: The method of any of Aspects 1-8, wherein monitoring, using the first PDCCH monitoring behavior, comprises monitoring a first PDCCH associated with the first CC, and wherein monitoring, using the second PDCCH monitoring behavior, comprises monitoring a second PDCCH associated with the second CC.

Aspect 10: The method of any of Aspects 1-9, further comprising receiving a configuration indicating the first DCI format and the second DCI format.

Aspect 11: The method of any of Aspects 1-10, further comprising: determining that the PDCCH monitoring behavior switch condition is satisfied by determining that the second CC is deactivated or determining that an active bandwidth part (BWP) of the second CC is a dormant BWP, wherein the first DCI format includes a set of dedicated data fields associated with the second CC, and wherein, in the first DCI format, the set of dedicated data fields associated with the second CC include physical downlink shared channel (PDSCH) scheduling information corresponding to the second CC, and wherein the second DCI format includes the set of dedicated data fields associated with the second CC, and wherein, in the second DCI format, the set of dedicated data fields associated with the second CC do not include the PDSCH scheduling information.

Aspect 12: The method of Aspect 11, wherein, in the second DCI format, the set of dedicated data fields associated with the second CC are fixed to a particular value.

Aspect 13: The method of either of Aspects 11 or 12, wherein a payload size of the first DCI format is equal to a payload size of the second DCI format.

Aspect 14: The method of any of Aspects 11-13, wherein, in the first DCI format, the set of dedicated data fields associated with the second CC indicate at least one of: a frequency domain resource allocation, a time domain resource allocation, a modulation and coding scheme, a hybrid automatic repeat request process identifier, a redundancy version, a transmitted precoding matrix indicator, or an antenna port.

Aspect 15: The method of any of Aspects 1-14, further comprising: determining that the PDCCH monitoring behavior switch condition is satisfied by determining that the second CC is deactivated or determining that an active bandwidth part (BWP) of the second CC is a dormant BWP, wherein the first DCI format includes a set of dedicated data fields associated with the second CC, and wherein, in the first DCI format, the set of dedicated data fields associated with the second CC include physical downlink shared channel scheduling information corresponding to the second CC, and wherein the second DCI format does not include the set of dedicated data fields associated with the second CC.

Aspect 16: The method of Aspect 15, wherein the first DCI format has a first payload size, and wherein the second DCI format has a second payload size that is smaller than the first payload size.

Aspect 17: The method of either of Aspects 15 or 16, wherein, in the first DCI format, the set of dedicated data fields associated with the second CC indicate at least one of: a frequency domain resource allocation, a time domain resource allocation, a modulation and coding scheme, a hybrid automatic repeat request process identifier, a redundancy version, a transmitted precoding matrix indicator, or an antenna port.

Aspect 18: The method of any of Aspects 1-17, further comprising: determining that the PDCCH monitoring behavior switch condition is satisfied by determining that the second CC is deactivated, or determining that an active bandwidth part (BWP) of the second CC is a dormant BWP, wherein the first DCI format has a first format type, and wherein the second DCI format has a second format type.

Aspect 19: The method of Aspect 18, wherein the first format type corresponds to multiple CC scheduling, and wherein the second format type corresponds to single CC scheduling.

Aspect 20: The method of Aspect 19, wherein the second format type comprises: a DCI format 1_0, a DCI format 1_1, or a DCI format 1_2.

Aspect 21: The method of any of Aspects 1-20, wherein monitoring, using the first PDCCH monitoring behavior, for the first DCI format comprises monitoring a first PDCCH for the first DCI format, wherein the first PDCCH corresponds to the second CC, and wherein monitoring, using the second PDCCH monitoring behavior, for the second DCI format comprises monitoring a second PDCCH for the second DCI format, wherein the second PDCCH corresponds to the first CC.

Aspect 22: The method of Aspect 21, further comprising determining that the PDCCH monitoring behavior switch condition is satisfied by determining that the second CC is deactivated, or determining that an active bandwidth part (BWP) of the second CC is a dormant BWP.

Aspect 23: The method of either of Aspects 21 or 22, wherein the first DCI format has a first format type, and wherein the second DCI format has a second format type that is different than the first format type.

Aspect 24: The method of Aspect 23, wherein the first format type corresponds to multiple CC scheduling or cross-CC scheduling, and wherein the second format type corresponds to single CC scheduling.

Aspect 25: The method of Aspect 24, wherein the second format type comprises: a DCI format 1_0, a DCI format 1_1, or a DCI format 1_2.

Aspect 26: The method of any of Aspects 1-25, further comprising determining that the PDCCH monitoring behavior switch condition is satisfied, wherein determining that the PDCCH monitoring behavior switch condition is satisfied comprises determining that an active downlink BWP satisfies a BWP switching condition, wherein the active downlink BWP is associated with at least one of the first CC or the second CC.

Aspect 27: The method of Aspect 26, wherein the active downlink BWP is associated with the second CC, wherein the first DCI format is associated with cross-carrying scheduling, wherein monitoring, using the first PDCCH monitoring behavior for the first DCI format, comprises monitoring a first PDCCH for the first DCI format, wherein the first PDCCH corresponds to the second CC, and wherein monitoring, using the second PDCCH monitoring behavior for the second DCI format, comprises monitoring a second PDCCH for the second format, wherein the second PDCCH corresponds to the first CC or a third CC.

Aspect 28: The method of Aspect 27, wherein the first DCI format has a first format type, and wherein the second DCI format has a second format type that is different than the first format type.

Aspect 29: The method of Aspect 28, wherein the first format type corresponds to multiple CC scheduling or cross-CC scheduling, and wherein the second format type corresponds to single CC scheduling.

Aspect 30: The method of Aspect 29, wherein the second format type comprises: a DCI format 1_0, a DCI format 1_1, or a DCI format 1_2.

Aspect 31: The method of any of Aspects 27-30, wherein the second PDCCH corresponds to the third CC, and wherein the second DCI format corresponds to cross-CC scheduling.

Aspect 32: The method of any of Aspects 26-31, wherein determining that the active downlink BWP satisfies the BWP switching condition comprises at least one of: determining that a bandwidth of the active downlink BWP satisfies a bandwidth threshold, determining that an achievable downlink data rate associated with the active downlink BWP satisfies a threshold, or determining that a BWP identifier associated with the active downlink BWP is identified as a non-scheduling BWP.

Aspect 33: The method of Aspect 32, wherein the achievable downlink data rate is based at least in part on at least one of: a subcarrier spacing associated with the active downlink BWP, a number of resource blocks associated with the active downlink BWP, a number of layers associated with the active downlink BWP, a maximum modulation and coding scheme value associated with the active downlink BWP, or an overhead factor associated with the active downlink BWP.

Aspect 34: The method of either of Aspects 32 or 33, further comprising receiving a list of non-scheduling BWPs, wherein determining that the BWP identifier associated with the active downlink BWP is identified as a non-scheduling BWP comprises determining that the BWP identifier is included in the list.

Aspect 35: The method of any of Aspects 32-34, wherein the active downlink BWP is associated with a scheduling CC, wherein the scheduling CC comprises a secondary cell, and wherein determining that the BWP identifier associated with the active downlink BWP is identified as a non-scheduling BWP comprises determining that the active downlink BWP is a dormant BWP.

Aspect 36: A method of wireless communication performed by a base station, comprising: transmitting, to a user equipment (UE), a first physical downlink shared channel (PDSCH) communication using a first plurality of PDSCH resources, wherein the first plurality of resources are indicated by a first downlink control information (DCI) communication having a first DCI format, wherein the first DCI communication indicates a set of resources associated with at least one of a cross component carrier (CC) scheduling or a multiple CC scheduling associated with a first CC and a second CC, wherein the set of resources includes the first plurality of PDSCH resources; and transmitting a second DCI communication having a second DCI format based at least in part on a determination that a physical downlink control channel (PDCCH) monitoring behavior switch condition is satisfied.

Aspect 37: The method of Aspect 36, further comprising transmitting, to the UE, a configuration that indicates the first DCI format and the second DCI format.

Aspect 38: The method of either of Aspects 36 or 37, further comprising determining that the PDCCH monitoring behavior switch condition is satisfied, wherein determining that the PDCCH monitoring behavior switch condition is satisfied comprises: determining that the second CC is deactivated, determining that an active bandwidth part (BWP) of the second CC is a dormant BWP, or determining that an active downlink BWP satisfies a BWP switching condition, wherein the active downlink BWP is associated with at least one of the first CC or the second CC.

Aspect 39: The method of any of Aspects 36-38, wherein the first CC is associated with a primary cell and the second CC is associated with a secondary cell.

Aspect 40: The method of any of Aspects 36-39, wherein the second DCI format is different than the first DCI format, and wherein at least one characteristic of the second DCI format is based at least in part on the determination that the PDCCH monitoring behavior switch condition is satisfied.

Aspect 41: The method of Aspect 40, wherein the at least one characteristic of the second DCI format comprises at least one of: a set of contents of the second DCI format, a size of the second DCI format, or a format type corresponding to the second DCI format.

Aspect 42: The method of Aspect 41, wherein the format type corresponding to the second DCI format matches a format type corresponding to the first DCI format, and wherein the at least one characteristic of the second DCI format comprises at least one of the set of contents of the second DCI format or the size of the second DCI format.

Aspect 43: The method of either of Aspects 41 or 42, wherein the at least one characteristic of the second DCI format comprises the set of contents of the second DCI format, and wherein the set of resources are associated with the multiple CC scheduling.

Aspect 44: The method of any of Aspects 41-43, wherein the at least one characteristic of the second DCI format comprises the set of contents of the second DCI format and the size of the second DCI format, and wherein the set of resources are associated with the multiple CC scheduling.

Aspect 45: The method of any of Aspects 36-44, wherein the base station provides the first CC, wherein the first CC comprises a scheduling CC, and wherein the method further comprises transmitting the first DCI communication, wherein the set of resources are associated with multiple CC scheduling, and wherein the set of resources includes a second plurality of PDSCH resources associated with the second CC, and wherein the determination that the PDCCH monitoring behavior switch condition is satisfied is based at least in part on a determination that the second CC is deactivated or a determination that an active bandwidth part (BWP) of the second CC is a dormant BWP.

Aspect 46: The method of Aspect 45, wherein the first DCI format includes a set of dedicated data fields associated with the second CC, and wherein, in the first DCI format, the set of dedicated data fields associated with the second CC include PDSCH scheduling information, wherein the PDSCH scheduling information indicates the second plurality of PDSCH resources.

Aspect 47: The method of Aspect 46, wherein, in the first DCI format, the set of dedicated data fields associated with the second CC indicate at least one of: a frequency domain resource allocation, a time domain resource allocation, a modulation and coding scheme, a hybrid automatic repeat request process identifier, a redundancy version, a transmitted precoding matrix indicator, or an antenna port.

Aspect 48: The method of either of Aspects 46 or 47, wherein the second DCI format includes the set of dedicated data fields associated with the second CC, and wherein, in the second DCI format, the set of dedicated data fields associated with the second CC do not include the PDSCH scheduling information.

Aspect 49: The method of Aspect 48, wherein, in the second DCI format, the set of dedicated data fields associated with the second CC are fixed to a particular value.

Aspect 50: The method of either of Aspects 48 or 49, wherein a payload size of the first DCI format is equal to a payload size of the second DCI format.

Aspect 51: The method of any of Aspects 46-50, wherein the second DCI format does not include the set of dedicated data fields associated with the second CC.

Aspect 52: The method of Aspect 51, wherein the first DCI format has a first payload size, and wherein the second DCI format has a second payload size that is smaller than the first payload size.

Aspect 53: The method of any of Aspects 46-52, wherein the second DCI format has a second format type.

Aspect 54: The method of Aspect 53, wherein the second format type corresponds to single CC scheduling.

Aspect 55: The method of either of Aspects 53 or 54, wherein the second format type comprises: a DCI format 1_0, a DCI format 1_1, or a DCI format 1_2.

Aspect 56: The method of any of Aspects 45-55, wherein the second DCI communication indicates an additional set of resources that include a third plurality of PDSCH resources associated with the first CC.

Aspect 57: The method of any of Aspects 36-56, wherein the base station provides the second CC, wherein the second CC comprises a scheduled CC that includes the first plurality of PDSCH resources; and wherein the determination that the PDCCH monitoring behavior switch condition is satisfied is based at least in part on a determination that the first CC is deactivated, or determining that an active bandwidth part (BWP) of the first CC is a dormant BWP.

Aspect 58: The method of any of Aspects 36-57, wherein the first DCI format has a first format type, and wherein the second DCI format has a second format type that is different than the first format type.

Aspect 59: The method of Aspect 58, wherein the first format type corresponds to multiple CC scheduling or cross-CC scheduling, and wherein the second format type corresponds to single CC scheduling.

Aspect 60: The method of either of Aspects 58 or 59, wherein the second format type comprises: a DCI format 1_0, a DCI format 1_1, or a DCI format 1_2.

Aspect 61: The method of any of Aspects 58-60, wherein the second DCI communication indicates an additional set of resources that include a third plurality of PDSCH resources associated with the second CC.

Aspect 62: The method of any of Aspects 36-61, wherein the base station provides the second CC, wherein the second CC comprises a scheduled CC that includes the first plurality of PDSCH resources; and wherein the determination that the PDCCH monitoring behavior switch condition is satisfied is based at least in part on a determination that an active downlink BWP satisfies a BWP switching condition, wherein the active downlink BWP is associated with the first CC.

Aspect 63: The method of Aspect 62, wherein the first DCI format has a first format type, and wherein the second DCI format has a second format type that is different than the first format type.

Aspect 64: The method of Aspect 63, wherein the first format type corresponds to cross-CC scheduling, and wherein the second format type corresponds to single CC scheduling.

Aspect 65: The method of Aspect 64, wherein the second format type comprises: a DCI format 1_0, a DCI format 1_1, or a DCI format 1_2.

Aspect 66: The method of any of Aspects 62-65, wherein the determination that the active downlink BWP satisfies the BWP switching condition is based at least in part on at least one of: a determination that a bandwidth of the active downlink BWP satisfies a bandwidth threshold, a determination that an achievable downlink data rate associated with the active downlink BWP satisfies a threshold, or a determination that a BWP identifier associated with the active downlink BWP is identified as a non-scheduling BWP.

Aspect 67: The method of Aspect 66, wherein the achievable downlink data rate is based at least in part on at least one of: a subcarrier spacing associated with the active downlink BWP, a number of resource blocks associated with the active downlink BWP, a number of layers associated with the active downlink BWP, a maximum modulation and coding scheme value associated with the active downlink BWP, or an overhead factor associated with the active downlink BWP.

Aspect 68: The method of either of Aspects 66 or 67, wherein the determination that the BWP identifier associated with the active downlink BWP is identified as a non-scheduling BWP is based at least in part on a determination that the BWP identifier is included in a list of non-scheduling BWPs.

Aspect 69: The method of any of Aspects 66-68, wherein the first CC is a scheduling CC, wherein the scheduling CC is a secondary cell, and wherein the determination that the BWP identifier associated with the active downlink BWP is identified as a non-scheduling BWP is based at least in part on a determination that the active downlink BWP is a dormant BWP.

Aspect 70: An apparatus for wireless communication at a device, comprising a processor; memory coupled with the processor; and instructions stored in the memory and executable by the processor to cause the apparatus to perform the method of one or more of Aspects 1-35.

Aspect 71: A device for wireless communication, comprising a memory and one or more processors coupled to the memory, the one or more processors configured to perform the method of one or more of Aspects 1-35.

Aspect 72: An apparatus for wireless communication, comprising at least one means for performing the method of one or more of Aspects 1-35.

Aspect 73: A non-transitory computer-readable medium storing code for wireless communication, the code comprising instructions executable by a processor to perform the method of one or more of Aspects 1-35.

Aspect 74: A non-transitory computer-readable medium storing a set of instructions for wireless communication, the set of instructions comprising one or more instructions that, when executed by one or more processors of a device, cause the device to perform the method of one or more of Aspects 1-35.

Aspect 75: An apparatus for wireless communication at a device, comprising a processor; memory coupled with the processor; and instructions stored in the memory and executable by the processor to cause the apparatus to perform the method of one or more of Aspects 36-69.

Aspect 76: A device for wireless communication, comprising a memory and one or more processors coupled to the memory, the one or more processors configured to perform the method of one or more of Aspects 36-69.

Aspect 77: An apparatus for wireless communication, comprising at least one means for performing the method of one or more of Aspects 36-69.

Aspect 78: A non-transitory computer-readable medium storing code for wireless communication, the code comprising instructions executable by a processor to perform the method of one or more of Aspects 36-69.

Aspect 79: A non-transitory computer-readable medium storing a set of instructions for wireless communication, the set of instructions comprising one or more instructions that, when executed by one or more processors of a device, cause the device to perform the method of one or more of Aspects 36-69.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a configuration indicating a first downlink control information (DCI) format and a second DCI format;
monitoring, using a first physical downlink control channel (PDCCH) monitoring behavior, a first PDCCH for the first DCI format that indicates a set of resources associated with at least one of a cross component carrier (CC) scheduling or a multiple CC scheduling associated with a first CC and a second CC;
determining that a PDCCH monitoring behavior switch condition is satisfied, wherein the PDCCH monitoring behavior switch condition is satisfied based at least in part on the second CC being deactivated, an active bandwidth part (BWP) of the second CC being a dormant BWP, or an active downlink BWP satisfying a BWP switching condition, wherein the active downlink BWP is associated with at least one of the first CC or the second CC; and
monitoring, using a second PDCCH monitoring behavior, a second PDCCH for the second DCI format based at least in part on the PDCCH monitoring behavior switch condition being satisfied.

2. The method of claim 1, wherein the first CC is associated with a primary cell and the second CC is associated with a secondary cell.

3. The method of claim 1, wherein the second DCI format is different than the first DCI format,
wherein at least one characteristic of the second DCI format is based at least in part on determining that the PDCCH monitoring behavior switch condition is satisfied, and
wherein the at least one characteristic of the second DCI format comprises at least one of:
a set of contents of the second DCI format,
a size of the second DCI format, or
a format type corresponding to the second DCI format.

4. The method of claim 3, wherein the format type corresponding to the second DCI format matches a format type corresponding to the first DCI format, and wherein the at least one characteristic of the second DCI format comprises at least one of the set of contents of the second DCI format or the size of the second DCI format.

5. The method of claim 3, wherein the at least one characteristic of the second DCI format comprises at least one of the set of contents of the second DCI format or the size of the second DCI format, and
wherein the set of resources are associated with the multiple CC scheduling.

6. The method of claim 1, wherein monitoring, using the first PDCCH monitoring behavior, comprises monitoring the first PDCCH associated with the first CC, and
wherein monitoring, using the second PDCCH monitoring behavior, comprises monitoring the second PDCCH associated with the second CC.

7. The method of claim 1, further comprising:
determining that the PDCCH monitoring behavior switch condition is satisfied by determining that the second CC is deactivated or determining that the active BWP of the second CC is a dormant BWP,
wherein the first DCI format includes a set of dedicated data fields associated with the second CC, and
wherein, in the first DCI format, the set of dedicated data fields associated with the second CC include physical downlink shared channel (PDSCH) scheduling information corresponding to the second CC, and
wherein the second DCI format includes the set of dedicated data fields associated with the second CC, and wherein, in the second DCI format, the set of dedicated data fields associated with the second CC do not include the PDSCH scheduling information.

8. The method of claim 7, wherein, in the second DCI format, the set of dedicated data fields associated with the second CC are fixed to a particular value.

9. The method of claim 7, wherein a payload size of the first DCI format is equal to a payload size of the second DCI format.

10. The method of claim 7, wherein, in the first DCI format, the set of dedicated data fields associated with the second CC indicate at least one of:
a frequency domain resource allocation,
a time domain resource allocation,
a modulation and coding scheme,
a hybrid automatic repeat request process identifier,
a redundancy version,
a transmitted precoding matrix indicator, or
an antenna port.

11. The method of claim 1, further comprising:
determining that the PDCCH monitoring behavior switch condition is satisfied by determining that the second CC is deactivated or determining that the active BWP of the second CC is a dormant BWP,
wherein the first DCI format includes a set of dedicated data fields associated with the second CC, and
wherein, in the first DCI format, the set of dedicated data fields associated with the second CC include physical downlink shared channel scheduling information corresponding to the second CC, and
wherein the second DCI format does not include the set of dedicated data fields associated with the second CC.

12. The method of claim 11, wherein the first DCI format has a first payload size, and
wherein the second DCI format has a second payload size that is smaller than the first payload size.

13. The method of claim 11, wherein, in the first DCI format, the set of dedicated data fields associated with the second CC indicate at least one of:
a frequency domain resource allocation,
a time domain resource allocation,
a modulation and coding scheme,
a hybrid automatic repeat request process identifier,
a redundancy version,
a transmitted precoding matrix indicator, or
an antenna port.

14. The method of claim 1, further comprising:
determining that the PDCCH monitoring behavior switch condition is satisfied by determining that the second CC is deactivated, or determining that the active BWP of the second CC is a dormant BWP,
wherein the first DCI format has a first format type, and
wherein the second DCI format has a second format type.

15. The method of claim 14, wherein the first format type corresponds to multiple CC scheduling, and
wherein the second format type corresponds to single CC scheduling, wherein the second format type comprises:
a DCI format 1_0,
a DCI format 1_1, or
a DCI format 1_2.

16. The method of claim 1, wherein the first PDCCH corresponds to the second CC, and wherein the second PDCCH corresponds to the first CC, the method further comprising determining that the PDCCH monitoring behavior switch condition is satisfied by determining that the second CC is deactivated, or determining that the active BWP of the second CC is a dormant BWP,
wherein the first DCI format has a first format type, and
wherein the second DCI format has a second format type that is different than the first format type.

17. The method of claim 16, wherein the first format type corresponds to multiple CC scheduling or cross-CC scheduling,
wherein the second format type corresponds to single CC scheduling, and
wherein the second format type comprises:
a DCI format 1_0,
a DCI format 1_1, or
a DCI format 1_2.

18. The method of claim 1, wherein determining that the PDCCH monitoring behavior switch condition is satisfied comprises determining that the active downlink BWP satisfies the BWP switching condition, wherein the active downlink BWP is associated with at least one of the first CC or the second CC.

19. The method of claim 18, wherein the active downlink BWP is associated with the second CC, wherein the first DCI format is associated with cross-carrying scheduling,
wherein the first PDCCH corresponds to the second CC, and
wherein the second PDCCH corresponds to the first CC or a third CC.

20. The method of claim 19, wherein the first DCI format has a first format type, and wherein the second DCI format has a second format type that is different than the first format type.

21. The method of claim 20, wherein the first format type corresponds to multiple CC scheduling or cross-CC scheduling,
wherein the second format type corresponds to single CC scheduling, and wherein the second format type comprises:
a DCI format 1_0,
a DCI format 1_1, or
a DCI format 1_2.

22. The method of claim 21, wherein the second PDCCH corresponds to the third CC, and
wherein the second DCI format corresponds to cross-CC scheduling.

23. The method of claim 21, wherein determining that the active downlink BWP satisfies the BWP switching condition comprises at least one of:
determining that a bandwidth of the active downlink BWP satisfies a bandwidth threshold,
determining that an achievable downlink data rate associated with the active downlink BWP satisfies a threshold, or
determining that a BWP identifier associated with the active downlink BWP is identified as a non-scheduling BWP.

24. The method of claim 23, wherein the achievable downlink data rate is based at least in part on at least one of:
a subcarrier spacing associated with the active downlink BWP,
a number of resource blocks associated with the active downlink BWP,
a number of layers associated with the active downlink BWP,
a maximum modulation and coding scheme value associated with the active downlink BWP, or
an overhead factor associated with the active downlink BWP.

25. The method of claim 23, further comprising receiving a list of non-scheduling BWPs, wherein determining that the BWP identifier associated with the active downlink BWP is identified as a non-scheduling BWP comprises determining that the BWP identifier is included in the list.

26. The method of claim 23, wherein the active downlink BWP is associated with a scheduling CC,
wherein the scheduling CC comprises a secondary cell, and
wherein determining that the BWP identifier associated with the active downlink BWP is identified as a non-scheduling BWP comprises determining that the active downlink BWP is a dormant BWP.

27. A method of wireless communication performed by a network entity, comprising:
transmitting, to a user equipment (UE), a first physical downlink shared channel (PDSCH) communication using a first plurality of PDSCH resources, wherein the first plurality of PDSCH resources are indicated by a first downlink control information (DCI) communication having a first DCI format, wherein the first DCI communication indicates a set of resources associated with at least one of a cross component carrier (CC) scheduling or a multiple CC scheduling associated with a first CC and a second CC, wherein the set of resources includes the first plurality of PDSCH resources;
determining that a physical downlink control channel (PDCCH) monitoring behavior switch condition is satisfied based at least in part on the second CC being deactivated, an active bandwidth part (BWP) of the second CC being a dormant BWP, or an active downlink BWP satisfying a BWP switching condition, wherein the active downlink BWP is associated with at least one of the first CC or the second CC; and transmitting a second DCI communication having a second DCI format based at least in part on the determination that the PDCCH monitoring behavior switch condition is satisfied.

28. An apparatus for wireless communication at a user equipment (UE), comprising:
a memory; and
one or more processors, coupled to the memory, configured to:
receive a configuration indicating a first downlink control information (DCI) format and a second DCI format;
monitor, using a first physical downlink control channel (PDCCH) monitoring behavior, a first PDCCH for the first DCI format that indicates a set of resources associated with at least one of a cross component carrier (CC) scheduling or a multiple CC scheduling associated with a first CC and a second CC;
determine that a PDCCH monitoring behavior switch condition is satisfied, wherein the PDCCH monitoring behavior switch condition is satisfied based at least in part on the second CC being deactivated, an active bandwidth part (BWP) of the second CC being a dormant BWP, or an active downlink BWP satisfying a BWP switching condition, wherein the active downlink BWP is associated with at least one of the first CC or the second CC; and
monitor, using a second PDCCH monitoring behavior, a second PDCCH for the second DCI format based at least in part on the PDCCH monitoring behavior switch condition being satisfied.

29. The apparatus of claim 28, wherein the one or more processors, to determine that the PDCCH monitoring behavior switch condition is satisfied, are configured to:
determine that the second CC is deactivated or determining that the active BWP of the second CC is a dormant BWP,
wherein the first DCI format includes a set of dedicated data fields associated with the second CC, and wherein, in the first DCI format, the set of dedicated data fields associated with the second CC include physical downlink shared channel (PDSCH) scheduling information corresponding to the second CC, and
wherein the second DCI format includes the set of dedicated data fields associated with the second CC, and wherein, in the second DCI format, the set of dedicated data fields associated with the second CC do not include the PDSCH scheduling information.

30. An apparatus for wireless communication at a base station network entity, comprising:
a memory; and
one or more processors, coupled to the memory, configured to:
transmit, to a user equipment (UE), a first physical downlink shared channel (PDSCH) communication using a first plurality of PDSCH resources, wherein the first plurality of PDSCH resources are indicated by a first downlink control information (DCI) communication having a first DCI format, wherein the first DCI communication indicates a set of resources associated with at least one of a cross component carrier (CC) scheduling or a multiple CC scheduling associated with a first CC and a second CC, wherein the set of resources includes the first plurality of PDSCH resources;
determine that a physical downlink control channel (PDCCH) monitoring behavior switch condition is satisfied based at least in part on the second CC being deactivated, an active bandwidth part (BWP) of the second CC being a dormant BWP, or an active downlink BWP satisfying a BWP switching condition, wherein the active downlink BWP is associated with at least one of the first CC or the second CC; and
transmit a second DCI communication having a second DCI format based at least in part on the PDCCH monitoring behavior switch condition being satisfied.

* * * * *